(12) United States Patent
Hou et al.

(10) Patent No.: US 10,400,589 B2
(45) Date of Patent: Sep. 3, 2019

(54) LOG PROCESSING AND FRACTURE CHARACTERIZATION IN BIAXIALLY ANISOTROPIC FORMATIONS

(71) Applicant: Halliburton Energy Services, Inc., Houston, TX (US)

(72) Inventors: Junsheng Hou, Kingwood, TX (US); Burkay Donderici, Houston, TX (US); Dagang Wu, Katy, TX (US)

(73) Assignee: Halliburton Energy Services, Inc., Houston ( * ) Notice: Subject to any disclaimer, the term of this patent is extended or adjusted under 35 U.S.C. 154(b) by 0 days.

(21) Appl. No.: 14/779,196

(22) PCT Filed: Apr. 17, 2015

(86) PCT No.: PCT/US2015/026516
§ 371 (c)(1),
(2) Date: Sep. 22, 2015

(87) PCT Pub. No.: WO2015/161282
PCT Pub. Date: Oct. 22, 2015

(65) Prior Publication Data
US 2016/0047239 A1   Feb. 18, 2016

Related U.S. Application Data

(60) Provisional application No. 61/981,576, filed on Apr. 18, 2014.

(51) Int. Cl.
*G01V 1/40* (2006.01)
*G01V 3/18* (2006.01)
(Continued)

(52) U.S. Cl.
CPC .............. *E21B 49/00* (2013.01); *E21B 19/22* (2013.01); *E21B 47/12* (2013.01); *G01V 3/28* (2013.01); *G01V 3/38* (2013.01)

(58) Field of Classification Search
CPC .......... E21B 19/22; E21B 47/12; E21B 49/00; G01V 3/28; G01V 3/38
(Continued)

(56) References Cited

U.S. PATENT DOCUMENTS

| 8,112,227 B2 | 2/2012 | Rabinovich et al. |
| 2004/0100263 A1* | 5/2004 | Fanini ............ G01V 3/28 324/339 |

(Continued)

FOREIGN PATENT DOCUMENTS

| WO | WO-2011/123379 A1 | 10/2011 |
| WO | 2014003784 A2 | 1/2014 |

OTHER PUBLICATIONS

"International Application Serial No. PCT/US2015/026516, International Search Report dated Jul. 22, 2015", 4 pgs.
(Continued)

*Primary Examiner* — Michael P Nghiem
(74) *Attorney, Agent, or Firm* — Gilliam IP PLLC

(57) ABSTRACT

Evaluation of formation and fracture characteristics based on multicomponent induction (MCI) log data includes automated calculation of inverted biaxial anisotropy (BA) parameters for the formation by performing an iterative BA inversion operation based on the MCI log data and using a BA formation model that accounts for transfers by axial formation anisotropy to resistivity. The BA inversion operation can be combined with a transversely anisotropic (TI) inversion based on the MCI log data and using a TI formation model, to calculate inverted TI parameters for the formation. The inverted BA parameters and the inverted TI parameters can be used, in combination, to calculate a quantified value for an identification function, to indicate estimated presence or absence of a fracture in the formation.

23 Claims, 19 Drawing Sheets

(51) Int. Cl.
| | |
|---|---|
| *G01V 5/04* | (2006.01) |
| *G01V 9/00* | (2006.01) |
| *E21B 49/00* | (2006.01) |
| *E21B 47/12* | (2012.01) |
| *E21B 19/22* | (2006.01) |
| *G01V 3/28* | (2006.01) |
| *G01V 3/38* | (2006.01) |

(58) Field of Classification Search
USPC .................................................. 702/7
See application file for complete search history.

(56) References Cited

U.S. PATENT DOCUMENTS

| | | | | |
|---|---|---|---|---|
| 2005/0256645 | A1 | 11/2005 | Rabinovich et al. | |
| 2006/0161350 | A1* | 7/2006 | Wang | G01V 3/28 702/6 |
| 2007/0170923 | A1* | 7/2007 | Forgang | G01V 3/28 324/339 |
| 2007/0208546 | A1* | 9/2007 | Fang | G01V 3/28 702/191 |
| 2008/0033654 | A1* | 2/2008 | Bespalov | G01V 3/28 702/7 |
| 2008/0215243 | A1* | 9/2008 | Rabinovich | G01V 3/28 702/7 |
| 2009/0018775 | A1 | 1/2009 | Tabarovsky et al. | |
| 2010/0004866 | A1 | 1/2010 | Rabinovich et al. | |
| 2010/0230095 | A1 | 9/2010 | Yin et al. | |
| 2013/0073206 | A1* | 3/2013 | Hou | G01V 3/28 702/7 |
| 2015/0247950 | A1* | 9/2015 | Perkins | G01J 3/0291 250/254 |
| 2016/0047934 | A1* | 2/2016 | Wang | G01V 3/18 702/7 |
| 2016/0054467 | A1* | 2/2016 | Li | G01V 3/18 702/7 |
| 2016/0070019 | A1* | 3/2016 | Wu | G01V 3/38 702/7 |
| 2016/0091622 | A1* | 3/2016 | Pei | G01V 1/28 702/11 |
| 2016/0282503 | A1* | 9/2016 | Hou | G01V 3/38 |
| 2018/0334901 | A1* | 11/2018 | Hou | E21B 41/0092 |

OTHER PUBLICATIONS

"International Application Serial No. PCT/US2015/026516, Written Opinion datd Jul. 22, 2015",4 pgs.

Georgi, D., et al., "Biaxial Anisotropy: Its Occurrence and Measurement with Multicomponent Induction Tools", *SPE 114739, SPE Annual Technical Conference and Exhibition*, Sep. 21-24 , Denver, Colorado, USA, (2008), 1-18.

Gianzero, S., et al., "The Response of a Triaxial Induction Sonde in a Biaxial Anisotropic Medium", *Petrophysics*, 43(3), (2002) 172-184.

Hou, Junsheng, et al., "A new multi-frequency triaxial array induction tool for enhancing evaluation of anisotropic formations and its field testing", *SPWLA 54th Annual Logging Symposium*, Jun. 22-26, 2013, (2013), 1-16.

Hou, Junsheng, et al., "New Scattered Potential Finite-difference Method with Anisotropic Background to Simulate Multicomponent Induction Logs", *PIERS 2011* in Suzhou, China., (2011), 1-12.

Hou, Junsheng, et al., "Real-time borehole correction for a new multi-component array induction logging tool in OBM wells", *SPWLA 53rd Annual Logging Symposium.*, (2012), 1-16.

Kriegshauser, B., et al., "A New Multicomponent Induction Logging Tool to Resolve Anisotropic Formations", *SPWLA 41st Annual Logging Symposium*, (Jun. 4-7, 2000), 1-14.

Rabinovich, M., et al., "Processing multicomponent induction data for formation dip and azimuth in anisotropic formations", *SPWLA 54th Annual Logging Symposium*, New Orleans, Louisiana, USA, Jun. 22-26, 2005, (2005), 1-14.

Rostral, Richard, et al., "Field test results of an experimental fully-triaxial induction tool", *SPWLA 44th Annual Logging Symposium*, Galveston, Texas, USA, Jun. 22-25, 2003, (2003), 1-14.

Wu, Peter, et al., "Efficient Hierarchical Processing and Interpretation of Triaxial Induction Data in Formations with Changing Dip", *SPE 135442, SPE 86th Annual Technical Conference and Exhibition*, Florence, Italy, Sep. 19-22, 2010, (2010), 1-14.

Wu, Peter, et al., "Fracture characterization using triaxial induction tools", *SPWLA 54th Annual Logging Symposium*, New Orleans, Louisiana, USA, Jun. 22-26, 2013, (2013), 1-16.

Yuan, N., et al., "Simulation of Full Responses of a Triaxial Induction Tool in a Homogeneous Biaxial Anisotropic Formation", *Geophysics*, 75(2), (2010), E101-E114.

"European Patent Application No. 15779857.0, Extended European Search Report dated Sep. 18, 2017", 7 pages.

Hou, et al., "Real-Time Borehole Correction of Multicomponent Induction Data Acquired in OBM Wells: Algorithm and Applications", Petrophysics, 54(2), Apr. 1, 2013, 128-141.

European Application Serial No. 15779857.0; communication Pursuant to Article 94(3) EPC, dated Aug. 1, 2018, 3 pages.

\* cited by examiner

US 10,400,589 B2

LOG PROCESSING AND FRACTURE CHARACTERIZATION IN BIAXIALLY ANISOTROPIC FORMATIONS

CLAIM OF PRIORITY

This application is a U.S. National Stage Filing under 35 U.S.C. 371 from International Application No. PCT/US2015/026516, filed on Apr. 17, 2015, which application claims the benefit of U.S. Provisional Application Ser. No. 61/981,576, filed on Apr. 18, 2014; which applications are incorporated by reference herein in their entirety.

TECHNICAL FIELD

This disclosure relates generally to hydrocarbon exploration and production, and more specifically to automated analysis and interpretation of measurements made by well logging instruments to determine Earth formation properties such as formation biaxial anisotropy and dip/azimuth. Some embodiments relate particularly to methods and systems for evaluation of formation properties based on processing multicomponent induction (MCI) measurements.

BACKGROUND

Modern operations for the exploration and production of oil and gas rely on access to a variety of information regarding subsurface geological parameters and conditions. Such information typically includes characteristics of Earth formations traversed by a borehole, as well as data relating to the size and mud of the borehole itself. The collection of information relating to subsurface conditions, which is commonly referred to as "logging," can be performed by several methods, including wireline logging and logging while drilling (LWD).

In wireline logging, a sonde is lowered into the borehole after some or all of the well has been drilled. The sonde hangs at the end of a wireline cable that provides mechanical support to the sonde and also provides an electrical connection between the sonde and electrical equipment located at the surface. In accordance with existing logging techniques, various parameters of the Earth's formations are measured and correlated with the position of the sonde in the borehole as the sonde is pulled uphole. In LWD, a drilling assembly includes sensing instruments that measure various parameters as the formation is penetrated, thereby enabling measurement of the formation during the drilling operation. Among the available wireline and LWD tools are a variety of resistivity logging tools including devices configured for taking MCI measurements.

BRIEF DESCRIPTION OF THE DRAWINGS

Some embodiments are illustrated by way of example and not limitation in the figures of the accompanying drawings in which.

DETAILED DESCRIPTION

Figure 1:
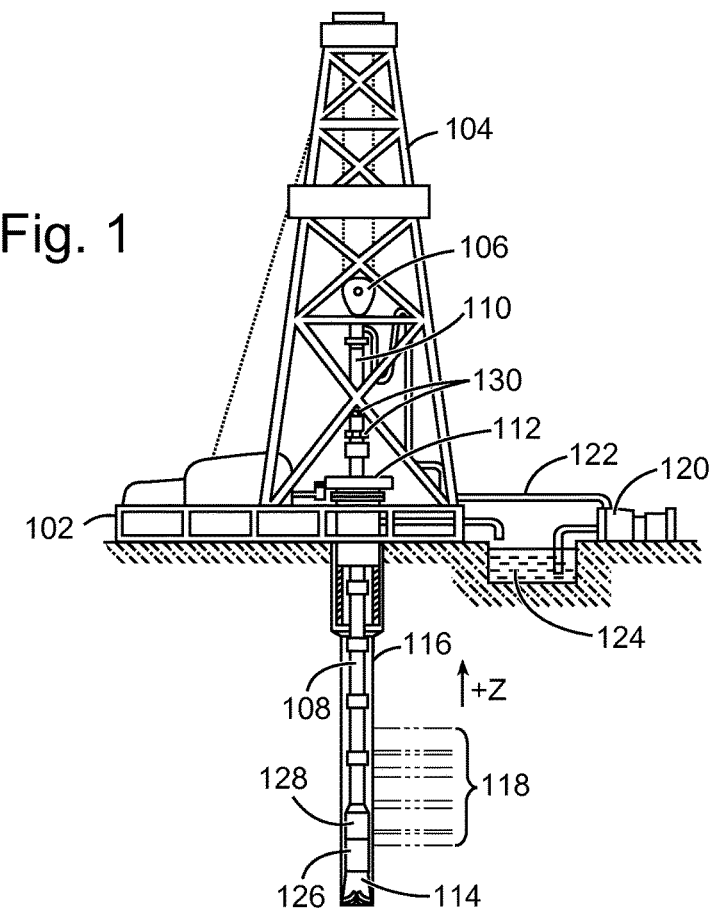
FIG. 1 is a schematic view of a system for capturing subsurface measurement data in a logging while drilling operation, in accordance with one or more example embodiments.

The following detailed description refers to the accompanying drawings that depict various details of examples selected to show how aspects of this disclosure may be practiced. The discussion addresses various examples of the disclosed subject matter at least partially in reference to these drawings, and describes the depicted embodiments in sufficient detail to enable those skilled in the art to practice the subject matter disclosed herein. Many other embodiments may be utilized for practicing the disclosed subject matter other than the illustrative examples discussed herein, and structural and operational changes in addition to the alternatives specifically discussed herein may be made without departing from the scope of the disclosed subject matter.

In this description, references to "one embodiment" or "an embodiment," or to "one example" or "an example," are not intended necessarily to refer to the same embodiment or example; however, neither are such embodiments mutually exclusive, unless so stated or as will be readily apparent to those of ordinary skill in the art having the benefit of this disclosure. Thus, a variety of combinations and/or integrations of the embodiments and examples described herein may be included, as well as further embodiments and examples as defined within the scope of all claims based on this disclosure, and all legal equivalents of such claims.

INTRODUCTION

Multi-component induction (MCI) logging can be used for determining formation resistivity (or conductivity, which is inversely related to resistivity) anisotropy and dip. Some processing and interpretation schemes are based on simplified transversely isotropic (TI) formation models.

A TI model can account for resistivity differences between, on the one hand, orthogonal axes lying in a formation or bedding plane (sometimes referred to as the horizontal or transverse plane), and, on the other hand, an axis perpendicular to the formation or bedding plane (sometimes referred to as the vertical axis). The TI model thus can account for anisotropy between the "vertical" axis and the "horizontal" plane, but assumes isotropy between different axes in the "horizontal" or transverse plane. For this reason, the TI model is also referred to being TI anisotropic. Unless the text or context clearly indicates otherwise, "horizontal" or "transverse" means a direction or plane substantially coinciding with a bedding plane of the relevant formation, and "vertical" means a direction of plane substantially orthogonal to the bedding plane of the relevant formation.

A biaxially anisotropy (BA) model, however, additionally accounts for anisotropy between orthogonal axes in the transverse plane, and is therefore also referred to as accounting for triaxial anisotropy. Note that, unless otherwise specified, "biaxial anisotropy" and its derivations refer to transverse biaxial anisotropy. Consistent with this terminology, a TI model does not account for biaxial anisotropy, even though it accounts for anisotropy between two axes (e.g., between the horizontal plane and the vertical axis)

Data processing and interpretation based on assuming TI anisotropy in the formation TI can be used for determining formation TI anisotropic resistivities, dip, and azimuth/ strike. Several different geological factors (e.g., fractures, cross-bedding, and varied depositional conditions in the bedding plane) can give rise to formation BA anisotropy, the most common being fractures that vertically cut across the formations. Many geological formations contain different types of natural and/or non-natural fractures. Fractured formations very often display resistivity biaxial anisotropy (BA). If a formation contains fractures that cut across the formation bedding plane, the conductivity/resistivity will no longer be of TI anisotropy but of BA anisotropy in the macroscopic petrophysical properties. Hydrocarbon reservoirs are, for example, often located in formations which are identified by borehole resistivity tools as having resistivity/ conductivity anisotropy. Examples include thinly laminated sand-shale or fractured bedded sand-sand/shale rock sequences.

Failure to take BA anisotropy into account can lead to incorrect or inaccurate results based on inversion of formation resistivity and dip, consequently resulting in misinterpretation of MCI measurements for the ensuing petrophysical applications. For example, instances where high formation dips (e.g., up to 90-degrees) are identified from inversion based on a TI model, especially where there is a significant resistivity/conductivity contrast between fractures and their background formations, can result in mischaracterization of formation and/or fracture properties. Moreover, fractures often play a critical role for fluid flow in formations and oil/gas production, especially for unconventional reservoirs.

For this reason, accurate characterization of formation BA anisotropy can be used to identify and quantify fractures, as disclosed with reference to the example embodiments that follow. Accurate estimation of fracture characteristics can promote successful development of a tight, heavily fractured reservoir, as the fractures play a significant role for both reservoir fluid flow and well productivity.

MCI processing and interpretation can be based at least in part on a BA formation model. Processing and interpretation of MCI measurement data may thus be performed based at least in part on BA parameterization, resulting in more accurate description of complex anisotropic formations than is the case based on TI model-based processing. One or more example embodiments described below provide a fast and practical method and system for MCI data processing to determine formation BA anisotropy (or tri-axial resistivities), dip, and azimuth in biaxially anisotropic formations.

Fracture evaluation with MCI data and measurement logs can be inverted based at least in part on the BA formation model also. Description of example embodiments that follow thus describe an inversion process based on the BA-model, detection of fracture existence using an identification (ID) function based on the inverted formation parameters and/or on MCI measurement data, and one or more methods for estimation of fracture azimuth and relative dip. In some embodiments, more accurate formation anisotropy (horizontal and vertical resistivities) and dip can be obtained based on the BA model, whereafter fractures are characterized by using both the measurements and processed log data. In one or more embodiments, structure evaluation is based at least in part on one or more inverted BA parameters and on one or more inverted TI parameters, wherein each inverted BA parameter comprises a value determined from inversion based on the BA model, and each inverted TI parameter comprises a value determined from inversion using the TI model. In such cases, the example embodiments disclose MCI data processing and interpretation based on the BA model combined with the TI model. In some example embodiments, identification of a fracture and estimation of its azimuth and relative dip is performed in an automated operation using differences of horizontal components of the MCI measurements in the transverse plane (e.g., XX and YY in the horizontal plane), inverted resistivity values for orthogonal axes in the transverse plane (e.g., Rx and Ry in the horizontal plane), two different inverted dip values calculated from the TI-model and BA-model respectively, and conventional resistivity logs such as R90 and R10 curves.

One or more of these parameters may be used to define an identification (ID) function for automated detection of facture existence. Some embodiments further comprising estimating fracture azimuth and dip in an automated operation based on the calculated principal y/x-axis azimuth and formation relative dip.

Benefits of the disclosed example embodiments include more accurate recovered formation parameters (e.g., anisotropic parameters and dip), and provision of parameters for use in automated fracture estimation (including fracture identification and quantification).

Example Measurement Environments

FIG. 1 is a schematic illustration of an example logging while drilling (LWD) environment. A drilling platform 102 is equipped with a derrick 104 that supports a hoist 106 for raising and lowering a drill string 108. The hoist 106 suspends a top drive 110 suitable for rotating the drill string 108 and lowering the drill string 108 through the well head 112. Connected to the lower end of the drill string 108 is a drill bit 114. As the drill bit 114 rotates, it creates a borehole 116 that passes through various formations 118. A pump 120 circulates drilling fluid through a supply pipe 122 to top drive 110, down through the interior of drill string 108, through orifices in drill bit 114, back to the surface via an annulus around drill string 108, and into a retention pit 124. The drilling fluid transports cuttings from the borehole 116 into the pit 124 and aids in maintaining the integrity of the borehole 116. Various materials can be used for drilling fluid, including a salt-water based conductive mud.

An assembly of LWD tools 126 is integrated into a bottom-hole assembly (BHA) near the bit 114. As the bit 114 extends the borehole 116 through the formations 118, LWD tools 126 collect measurements relating to various formation properties as well as the tool orientation and various other drilling conditions. The LWD tools 126 may take the form of a drill collar, i.e., a thick-waffled tubular that provides weight and rigidity to aid the drilling process. In this example embodiment, the LWD tools 126 include a multi-array triaxial induction tool to measure formation resistivity and delivered MCI measurement data, also referred to as log data, for example such as described further herein. A telemetry sub 128 may be included to transfer images and measurement data to a surface receiver 130 and to receive commands from the surface. In some embodiments, the telemetry sub 128 does not communicate with the surface, but rather stores logging data for later retrieval at the surface when the logging assembly is recovered.

Figure 2:
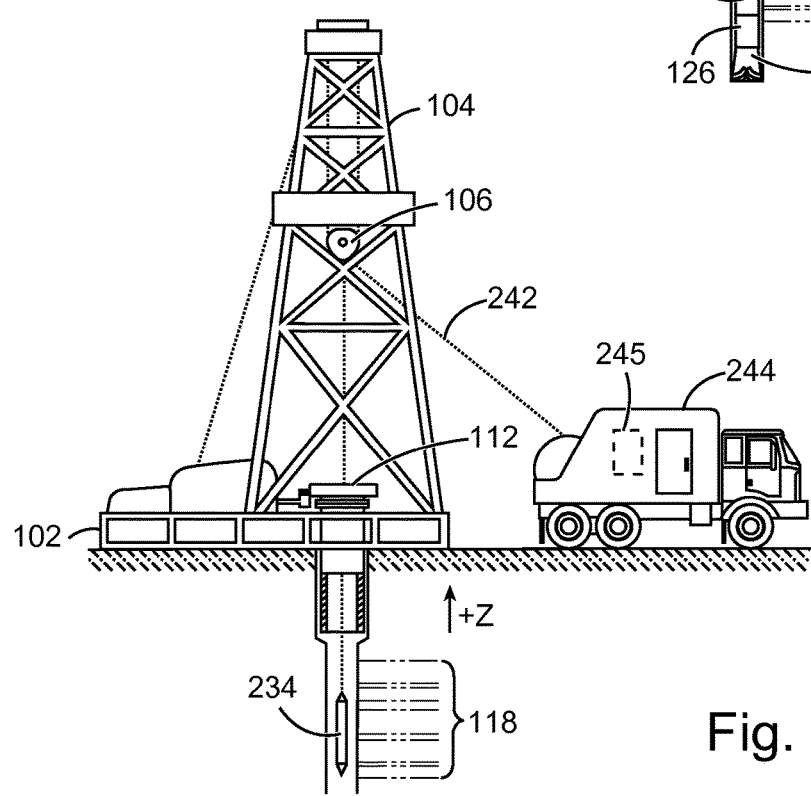
FIG. 2 is a schematic view of a system for capturing subsurface measurement data in a wireline logging operation, in accordance with one or more example embodiments.

At various times during the drilling process, the drill string 108 may be removed from the borehole 116 as shown in FIG. 2. Once the drill string 108 has been removed, logging operations can be conducted using a wireline logging sonde 234, i.e., a probe suspended by a cable 242 having conductors for conducting power to the sonde 234, and for transmitting telemetry data from the sonde 234 to the surface. The example wireline logging sonde 234 may have pads and/or centralizing springs to maintain the sonde 234 near the central axis of the borehole 116 as sonde 234 is pulled uphole. The logging sonde 234 can include a variety of sensors including a multi-array triaxial induction tool for measuring formation resistivity and providing MCI measurement data. A logging facility 244 collects measurements from the logging sonde 234, and includes a computer system 245 for processing and storing the measurements gathered by the sensors.

Figure 3:
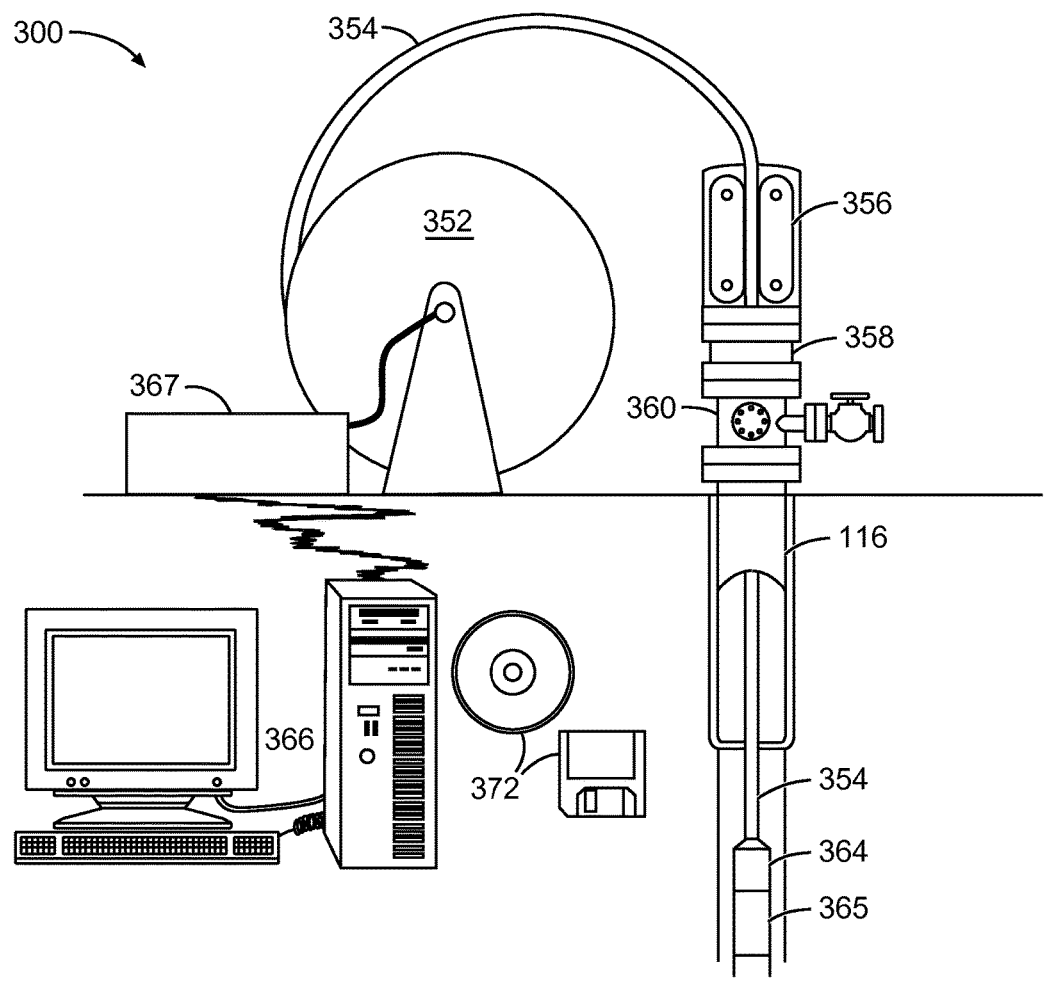
FIG. 3 is a schematic view of a coil tube logging system for capturing subsurface measurement data, in accordance with one or more example embodiments.

Yet a further alternative logging technique is schematically illustrated in FIG. 3, which shows an example embodiment of a coil tubing logging system 300. In system 300, coil tubing 354 is pulled from a spool 352 by a tubing injector 356 and injected through a packer 358 and a blowout preventer 360 into the borehole 116. In the borehole 116, a supervisory sub 364 and one or more logging tools 365 are coupled to the coil tubing 354 and configured to communicate to a surface computer system 366 via information conduits or other telemetry channels. An uphole interface 367 may be provided to exchange communications with the supervisory sub 364 and receive data to be conveyed to the surface computer system 366.

Surface computer system 366 is configured to communicate with supervisory sub 364 to set logging parameters and collect logging information from the one or more logging tools 365. Surface computer system 366 is configured by software (shown in FIG. 3 as being stored on example embodiments of removable storage media 372) to monitor and control downhole instruments 364, 365. The surface computer system 366 may be a computer system such as that described further herein.

MCI Conductivity-Tensor Measurements

Figure 4:
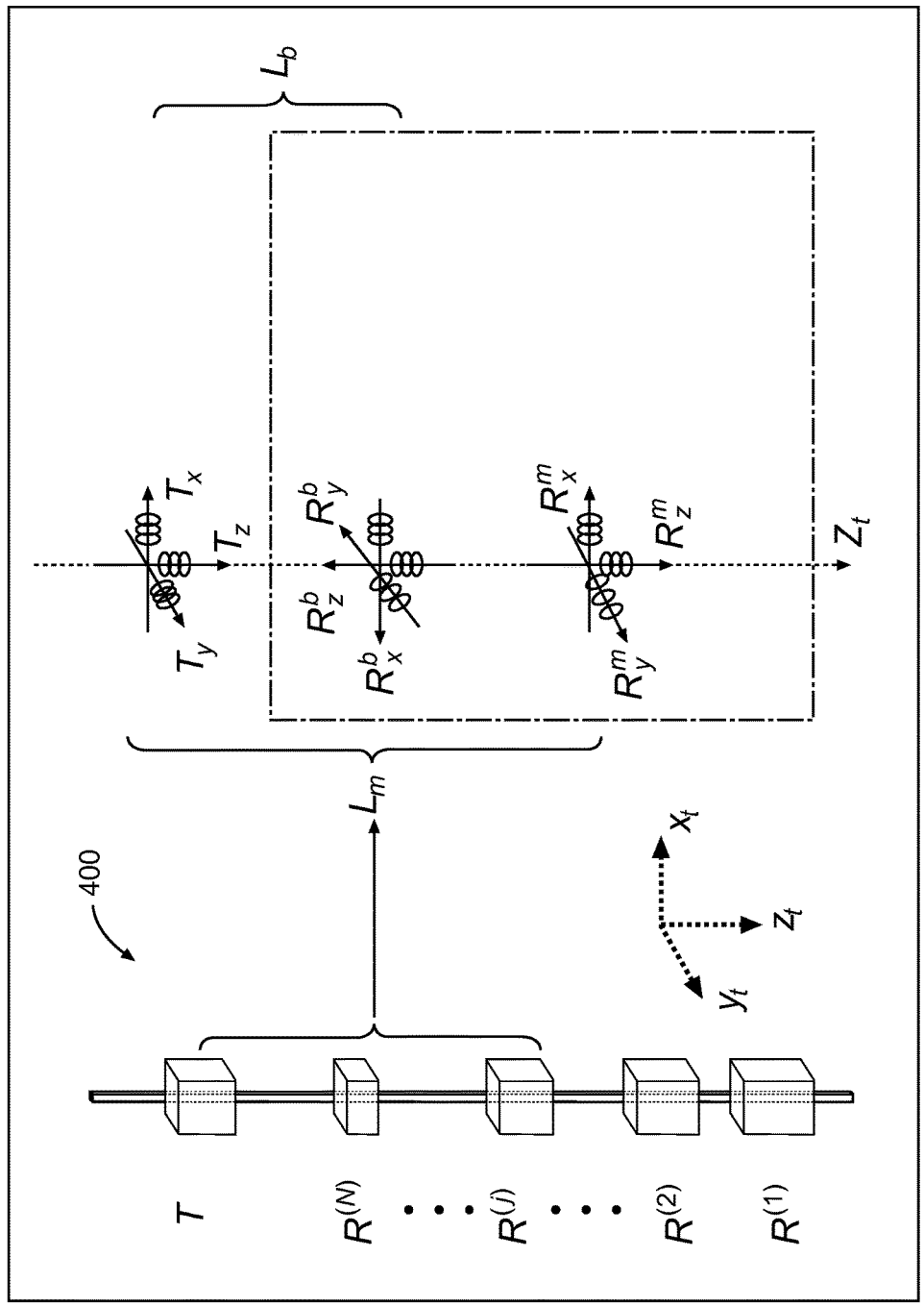
FIG. 4 is a schematic block diagram showing an example configuration of a multi-array triaxial induction tool, in accordance with one or more example embodiments.

An example multi-array triaxial induction tool 400 is depicted in FIG. 4. The example tool 400 consists of multiple triaxial arrays with every subarray (i.e., $TR^{(1)}$, $TR^{(2)}$, ..., and $TR^{(N)}$, also denoted as A1, A2, ..., and AN) composed of three mutually orthogonal collocated antennas. Every single triaxial subarray may comprise a transmitter triad ($T_x$, $T_y$, and $T_z$), and, for each receiver, a separate main triad ($R_x^m$, $R_y^m$, and $R_z^m$) and a separate bucking triad ($R_x^b$, $R_y^b$, and $R_z^b$). $L_m$ and $L_b$ denote the transmitter-receiver spacing of the main and bucking receivers, respectively. Accordingly, each subarray may produce a nine-coupling voltage measurement at every log depth in the tool/measurement coordinate system denoted as ($x_t$, $y_t$, $z_t$).

The voltages measured on all receivers need to be converted into apparent conductivities. In general, the apparent conductivities are symbolically expressed as a 3 by 3 tensor or matrix for a multi-array triaxial tool operated at multiple frequencies:

$$\overline{\overline{\sigma_a^{(i,j)}}} = \begin{pmatrix} \sigma_{xx}^{(i,j)} & \sigma_{xy}^{(i,j)} & \sigma_{xz}^{(i,j)} \\ \sigma_{yx}^{(i,j)} & \sigma_{yy}^{(i,j)} & \sigma_{yz}^{(i,j)} \\ \sigma_{zx}^{(i,j)} & \sigma_{zy}^{(i,j)} & \sigma_{zz}^{(i,j)} \end{pmatrix} = \left(\sigma_{IJ}^{(i,j)}\right)_{(3\times 3)}, \quad (1a)$$

or $$\overline{\overline{\sigma_a^{(i,j)}}} = \begin{pmatrix} XX^{(i,j)} & XY^{(i,j)} & XZ^{(i,j)} \\ YX^{(i,j)} & YY^{(i,j)} & YZ^{(i,j)} \\ ZX^{(i,j)} & ZY^{(i,j)} & ZZ^{(i,j)} \end{pmatrix} = \left(IJ^{(i,j)}\right)_{(3\times 3)}, \quad (1b)$$

where $I,J=x/X, y/Y, z/Z$; $i=1, 2, \ldots, N$; $j=1, 2, \ldots, M$; $\overline{\overline{\sigma_a^{(i,j)}}}$ is referred to as the MCI apparent conductivity tensor (R- or X-signal) in the tool coordinate system; $\sigma_{IJ}^{(i,j)}/IJ^{(i,j)}$ are the measured-conductivity couplings of $\overline{\overline{\sigma_a^{(i,j)}}}$, wherein the first subscript I indicates the transmitter direction, and the second subscript J indicates the receiver direction. Consequently, for example, when I, J=x/X, $\sigma_{IJ}^{(i,j)}$ is $\sigma_{xx}^{(i,j)}$ (or $XX^{(i,j)}$), when I, J=y/Y, is $\sigma_{IJ}^{(i,j)}$ is $\sigma_{yy}^{(i,j)}$ (or $YY^{(i,j)}$), and when I, J=z/Z, $\sigma_{IJ}^{(i,j)}$ is $\sigma_{zz}^{(i,j)}$ (or $ZZ^{(i,j)}$), which are the traditional multiarray induction measurements. N is the total number of the triaxial subarrays, and M is the total number of the operated frequencies. Hence, the 2*9*M*N R- and X-signal data for every log point should be obtained.

Forward Models and their Libraries

Forward modeling comprises a medical or numerical solution of Maxwell's equation in a mathematical boundary value problem, where the relevant formation or this model specifies boundaries and shapes of both regions of different resistivity. Processes for deriving formation parameters from a set of given field logs is known as inverse modeling, and typically comprises iteratively adjusting selected formation parameters in one or more layers of a formation model, and repeating forward modeling (e.g., by and the calculation or with reference to pre-calculated library data), until the observed field logs are satisfactorily replicated, e.g. until a set of variable borehole parameters is found for a best fit with the observed log data based on the applicable formation model.

Figure 5:
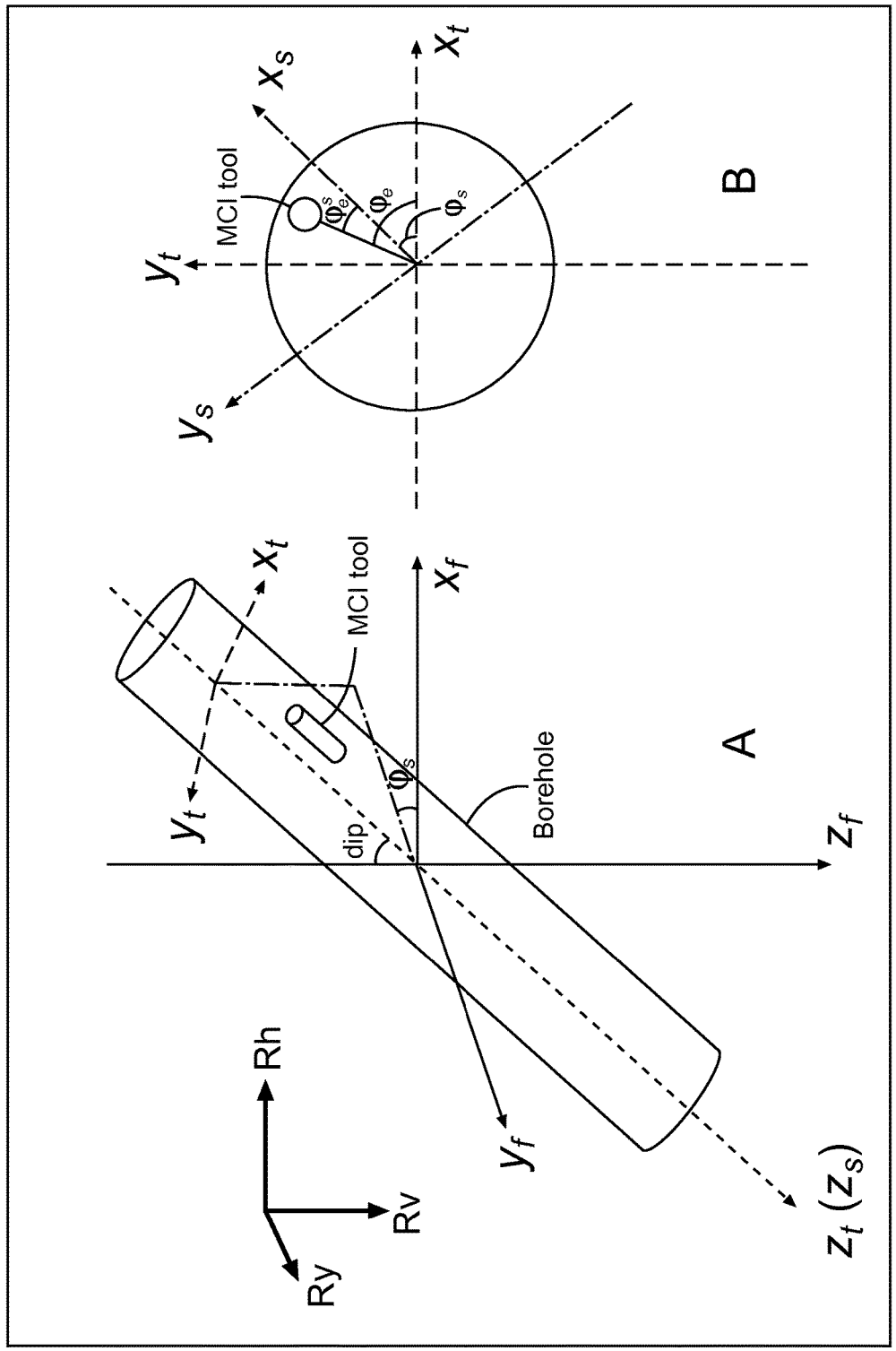
FIG. 5 is a schematic diagram of a radially one-dimensional (R1D) borehole-formation model for MCI data processing according to one or more example embodiments. The diagram includes two panels, numbered A and B respectively. Panel A shows a three-dimensional (3D) view of the borehole-formation model, panel B is a top-down two-dimensional (2D) view in the x-y plane of the tool/measurement system (designated $x_t$-$y_t$).

Some of the example MCI processing schemes disclosed herein are based at least in part on a radially one-dimensional (R1D) borehole-formation model. Hence the invasion and shoulder-bed (or boundary) effects in this model are ignored. The model may thus consist of a borehole with a circular cross section surrounded by an infinitely thick homogeneous formation (see FIG. 5). The borehole may be vertical or deviated, and the MCI logging tool can be centralized or decentralized in the borehole.

Note that some existing techniques process multifrequency MCI measurement data to account for skin effects, before inversion of the MCI data. In embodiments described herein, the inversion schemes are not reliant on prior correction for removing skin effects, or on multifrequency MCI data to account for such skin effects. These features enable inversion based on single-frequency MCI data, providing for real-time inversion and evaluation of formation/fracture properties.

As discussed previously, formation resistivity/conductivity can be isotropic or anisotropic (transversely isotropic or bi-axially anisotropic). We describe formation resistivity/conductivity BA anisotropy in the principal axis coordinate system. This system is chosen so that the x or y direction coincides with the conductivity tensor principal axis having the largest conductivity component in the bedding plane; the z axis is parallel to the conductivity principal axis having the smallest conductivity component. In this principal axis coordinate system, the formation conductivity can be expressed as a diagonal tensor $$\overline{\overline{\sigma}} = \begin{pmatrix} \sigma_x & & \\ & \sigma_y & \\ & & \sigma_z \end{pmatrix} = \text{diag}(\sigma_x, \sigma_y, \sigma_z), \quad (2)$$

where $\overline{\overline{\sigma}}$ is the formation conductivity tensor, its elements $\sigma_x$ and $\sigma_y$ are the conductivities in the two principal-axis directions in the bedding plane and $\sigma_z$ are the conductivity in the principal-axis direction perpendicular to the bedding plane, and $\sigma_x=1/R_x$, $\sigma_y=1/R_y$, and $\sigma_z=1/R_z$. Here $R_x$, $R_y$ and $R_z$ are the three resistivity components in the three principal-axis directions, respectively. Hence, the resistivity tensor is given by $\overline{\overline{R}}=\text{diag}(R_x,R_y,R_z)$ with anisotropy description of triaxial resistivities. If $R_x=R_y=R_z$, then the formation resistivity is isotropic; If only $R_x=R_y$, then the formation resistivity is transversely isotropic, and therefore, in the bedding plane, only one resistivity is needed, both $R_x$ and $R_y$ are referred to as the horizontal resistivity and often denoted as $R_h$. Similarly, $R_z$ is known as the vertical resistivity and usually denoted as $R_v$. Otherwise, the formation resistivity is referred to as biaxial anisotropy. It can be seen that isotropy and transverse isotropy are only the two special cases in the biaxial anisotropy. For the practical applications, different ratio notations are used. For example, ratios Rxy=Rx/Ry, or Rzx=Rz/Rx and Rzy=Rz/Ry.

Numerical simulations showed that for a given subarray operated at a given frequency, the MCI apparent conductivity tensor $\overline{\overline{\sigma_a^{(i,j)}}}$ depends on the following nine borehole-formation parameters:

$R_x$ and $R_y$: formation horizontal resistivities (or horizontal conductivities), ohm-m;

$R_z$: formation vertical resistivity (or vertical conductivity);

$\phi_s$: formation-resistivity horizontal principal axis/borehole strike or azimuth, degree;

BD: borehole diameter, inch or meter;

$R_m$: borehole mud resistivity, ohm-m;

$d_e$: tool's eccentric distance, given by the distance from the borehole center to the center of the tool, or as eccentricity ratio (ecc=2 $d_e$/BD);

$\varphi_e$: tool eccentricity azimuthal angle in the tool/measurement coordinate system;

$\varphi_e^s$: tool eccentricity angle in the strike system $\varphi_e^s=\varphi_e-\phi_s$, degree; and dip: relative dip angle between formation and borehole, degree.

Compared to R1D models with isotropy or TI anisotropy (often called the R1D-TI model), the R1D forward model used in the described embodiments includes additional model parameters such as Rx and Ry. However, numerical forward simulation of the MCI log response is usually a more time-consuming 3D EM forward computation based on this IUD model (or R1D-BA model). For inversion based on the R1D-BA model, the described methods in some embodiments uses a pre-computed MCI response data library as the inversion's forward engine, similar to that used for TI-model based IUD inversion.

In the above-described IUD model, if the model only consists of a homogeneous unbounded formation, then it is also referred to as a zero-D model (0D). For a BA formation which is referred to as the 0D-BA model, five parameters (Rx, Ry, Rz, dip, and strike/azimuth) can be used to describe the model. Due to the mathematical complexity in the numerical simulation for this 0D model, the MCI responses may be pre-calculated and saved into a data library and used as the forward engine in the 0D inversion. As the MCI responses at non-zero strikes can be obtained by rotating the responses to the zero strike, only responses spanned in the 4-dimensional space of the variables Rx, Ry, Rz, and dip need be precalculated, thus making the data library much smaller. Moreover, if the hole is surrounded by a layered formation with invasion, it may be modeled as a three-dimensional (3D) model, while a vertical one-dimensional (V1D) model can be employed for a layered formation without hole and invasion.

In addition, the following three 3D Cartesian coordinate systems come into play for describing all forward models:
tool/measurement coordinate system $(x_t, y_t, z_t)$;
formation resistivity's principal axis coordinate system $(x_f, y_f, z_f)$; and
strike coordinate system $(x_s, y_s, z_s=z_t)$.
These coordinate systems are connected by some coordinate rotation matrices.

It is known that MCI conductivity measurements are sensitive to dip, horizontal and vertical resistivity in TI formations. Numerical examples will now be presented to show MCI sensitivity to different Rxy (=Rx/Ry) ratio values by using the 0D and 3D BA formation models versus TI anisotropy.

For the 0D formation model, consider a full-space biaxially anisotropic formation with fixed Rx=2 ohm-m and Rz=10 ohm-m. The relative dip of the BA formation is set to 60 degrees and the azimuth/strike of the x-axis in the formation's principal axis coordinate system is set to zero degree (for non-zero azimuth, MCI responses can be gained by the rotation of the responses at zero azimuth). Then, the MCI responses are calculated for different Rxy values varying from 0.2 to 4 (or Ry varying from 10 ohm-m to 0.5 ohm-m) with total 15 cases. When Rxy=1, the formation is TI anisotropic. In all these cases, due to the zero azimuth, only 5 components (3 direct component: XX, YY, and ZZ, and two cross components: XZ and ZX) are non-zero and we have XZ=ZX. Therefore, only four components—XX, YY, ZZ, and XZ or ZX need be shown in the numerical simulated results. In addition, a commercial MCI tool named Xaminer™-MCI (Hou et. al, 2013, *A New Multifrequency Triaxial Array Induction Tool for Enhancing Evaluation of Anisotropic Formations and Field Testing*: Paper presented at SPWLA 54th annual meeting, New Orleans, La., USA, 22-26 June) is assumed, which is similar to the layout as shown in FIG. 4 for the measurement simulation. Example MCI tool includes four triaxial subarrays (A1, A2, A3, and A4, here they are ordered based on their space length) operated at multiple frequencies, such as 12 k and 60 k.

Figure 6:
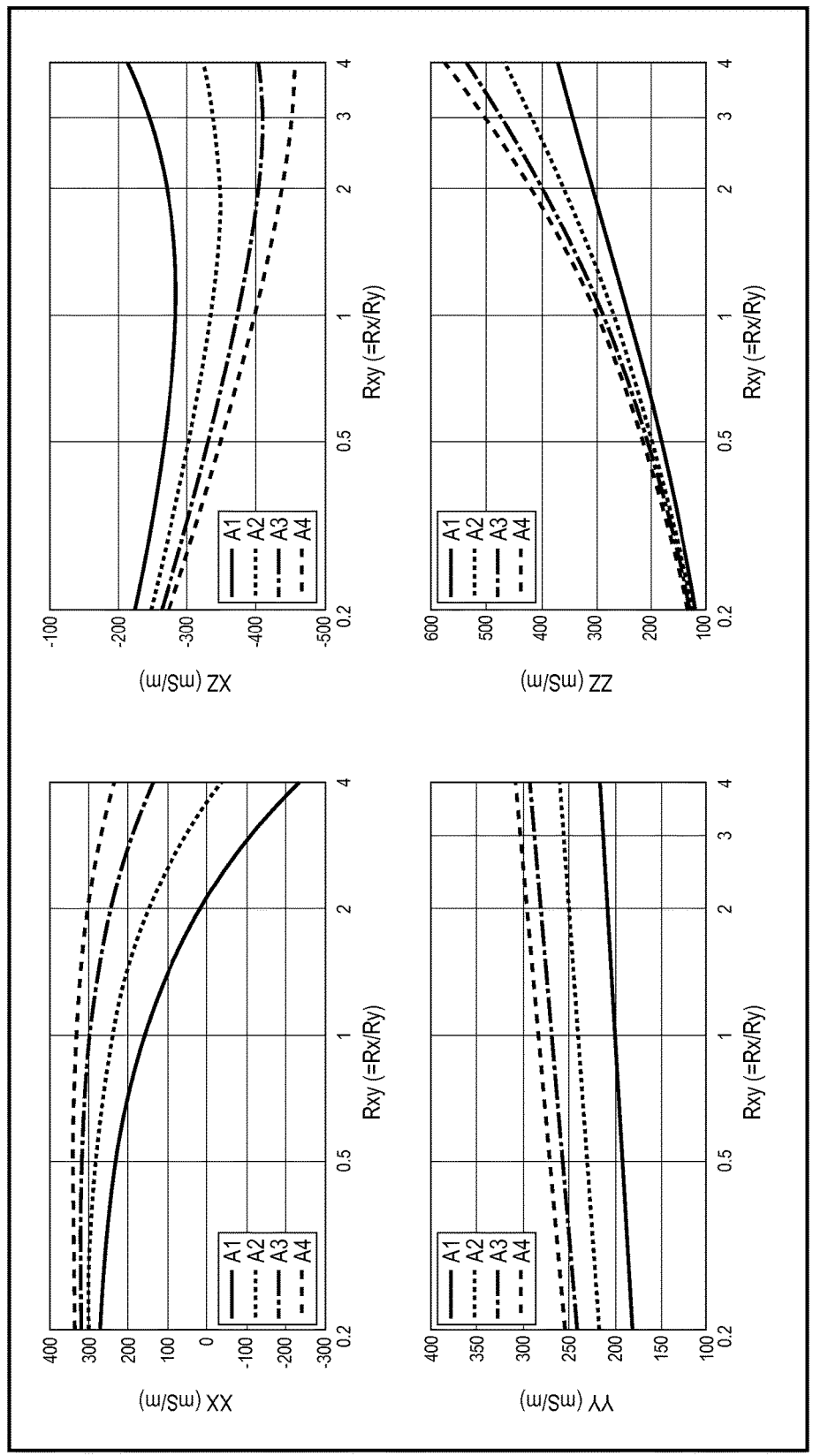
FIG. 6 is a set of graphs showing example MCI measurement values (XX, XZ, YY, and ZZ) at 12 kHz versus horizontal resistivity ratio Rxy (=Rx/Ry), according to one or more example embodiments.
Figure 7:
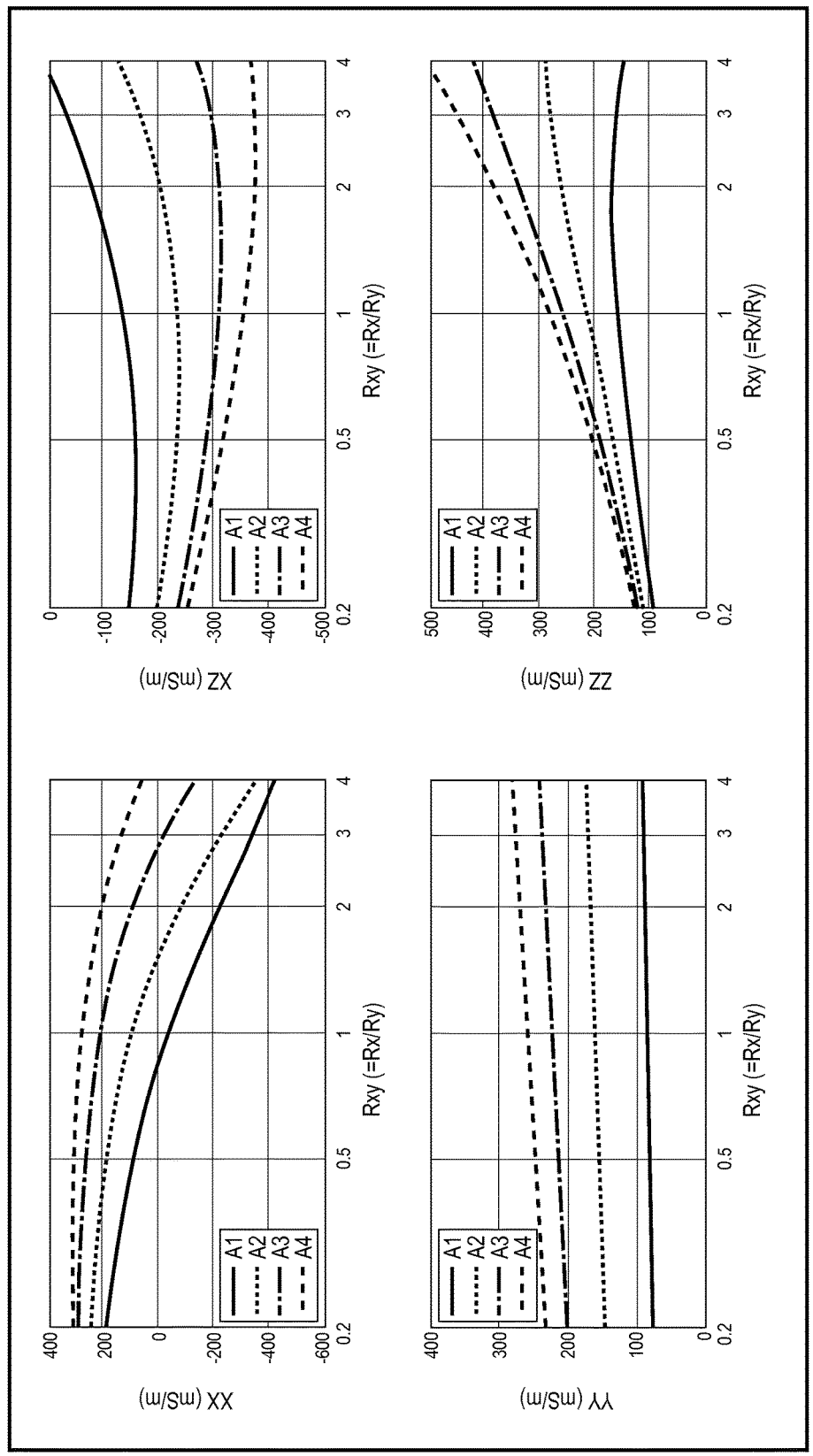
FIG. 7 is a set of graphs showing example MCI measurement values (XX, XZ, YY, and ZZ) at 60 kHz versus horizontal resistivity ratio Rxy (Rx/Ry), according to one or more example embodiments. The MCI measurement data of FIGS. 6 and 7 are captured in the same borehole, with all parameters except the minimum frequency being substantially the same.

FIGS. 6 and 7 show MCI simulated results of four triaxial arrays at 12 kHz and 60 kHz plotted as a function of horizontal resistivity ratio Rxy. In all panels of these two Figures, the x-axis is the ratio Rxy and the y-axis is a simulated MCI component. Compared to the MCI responses at Rxy=1 (TI case), the MCI responses have obvious changes with different Rxy values, especially at high Rxy. As both Rx and Rz are fixed in all cases but the YY mainly depends on the Rx and Rz, the YY responses display weaker sensitivity compared to other components. It can be observed, however, that all four components generally display good sensitivity to biaxial anisotropy Rxy (or horizontal resistivity anisotropy). This insight suggests that the MCI data can be used for inversion of the unknown BA formation parameters, and that the different sensitivities among different components such as XX and YY may be used to indicate the formation BA anisotropy resulting from the fractures. Additionally, the response differences can be used for indicating fracture presence.

Figure 8:
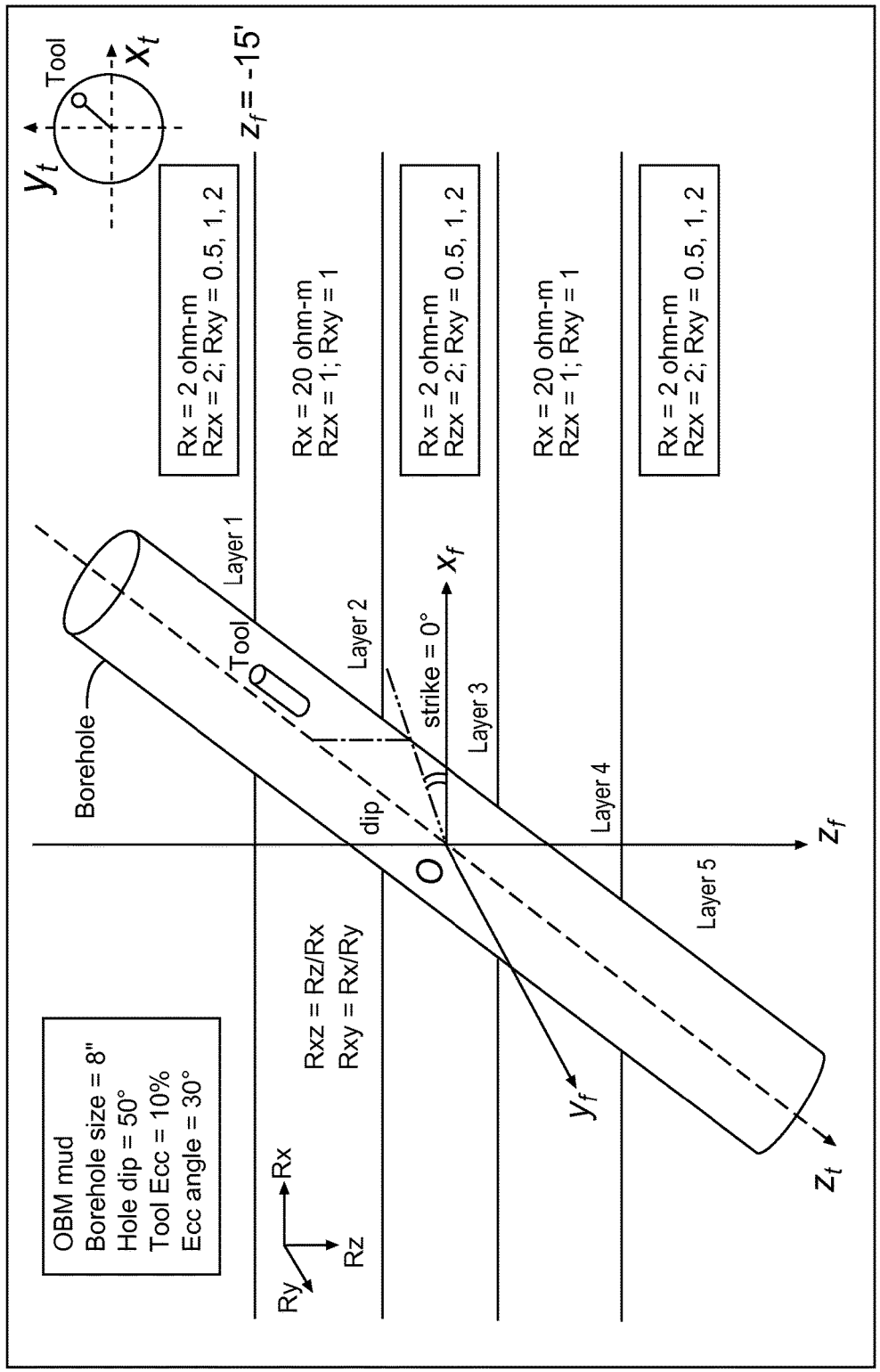
FIG. 8 is a diagram of a fully 3D model which consists of a deviated borehole surrounded by a 5-layer formation and that accounts for transverse biaxial anisotropy, according to one or more example embodiments.

For the 3D model, we consider a 50°-deviated borehole filled with OBM surrounded by a 5-layer formation as shown in FIG. 8, wherein there is no invasion in each layer, and all layers are ordered 1, 2, . . . , 5, beginning from the uppermost layer and layers 1 and 5 are semi-infinite half-spaces and the remaining three layers have the same thickness, here 10 ft. In this model, layers 1, 3, and 5 are biaxially anisotropic and have identical resistivity parameters, with Rx=2 ohm-m, Rzx=2, and Rxy=0.5, 1, and 2. Layers 2 and 4 are isotropic and they have the same resistivity—20 ohm-m (Rx=Ry=Rz). The azimuth/strike of the x-axis in the formation's principal axis coordinate system is set to zero degree and the tool is decentralized at the eccentric angle of 30 degrees and eccentricity of 10%. All other remaining simulation parameters are shown in FIG. 8. The assumed MCI tool is also the Xaminer™-MCI and the corresponding multiarray and multifrequency MCI logs for three different Rxy values in layers 1, 3, and 5 are simulated with 3DFD code (see, for example, Hou et. al, 2011, *New Scattered Potential Finite Difference Method with Anisotropic Background to Simulate Multicomponent Induction Logs*: PIERS 2011 in Suzhou, China).

Figure 9:
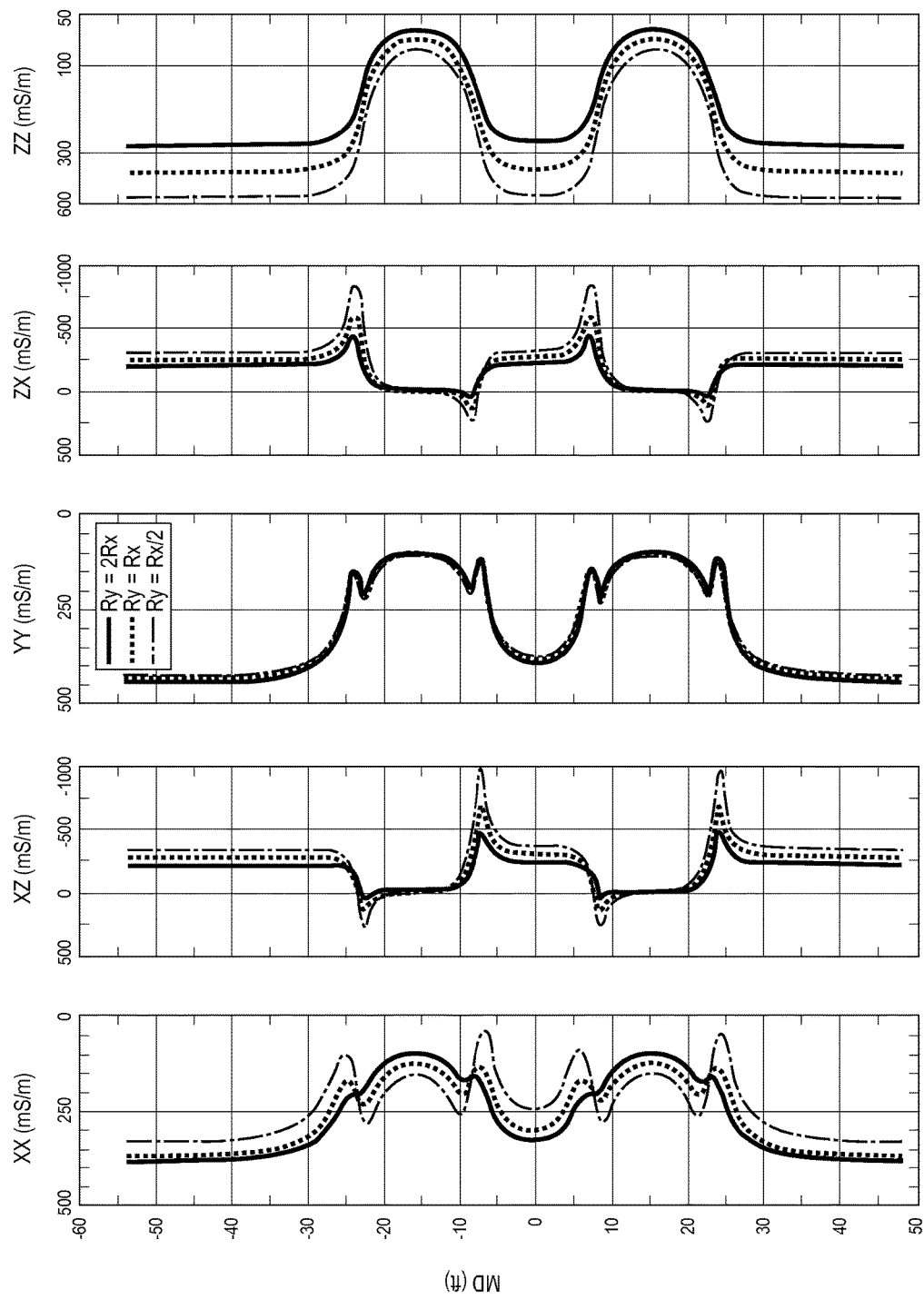
FIG. 9 is an example set of graphs showing a comparison of simulated XX, XZ, YY, ZX, and ZZ logs for three different Rxy values of a particular triaxial subarray (here, subarray A3) of an MCI measurement tool at a frequency of 12 kHz for a fully 3D model in consistent with that of FIG. 8.
Figure 10:
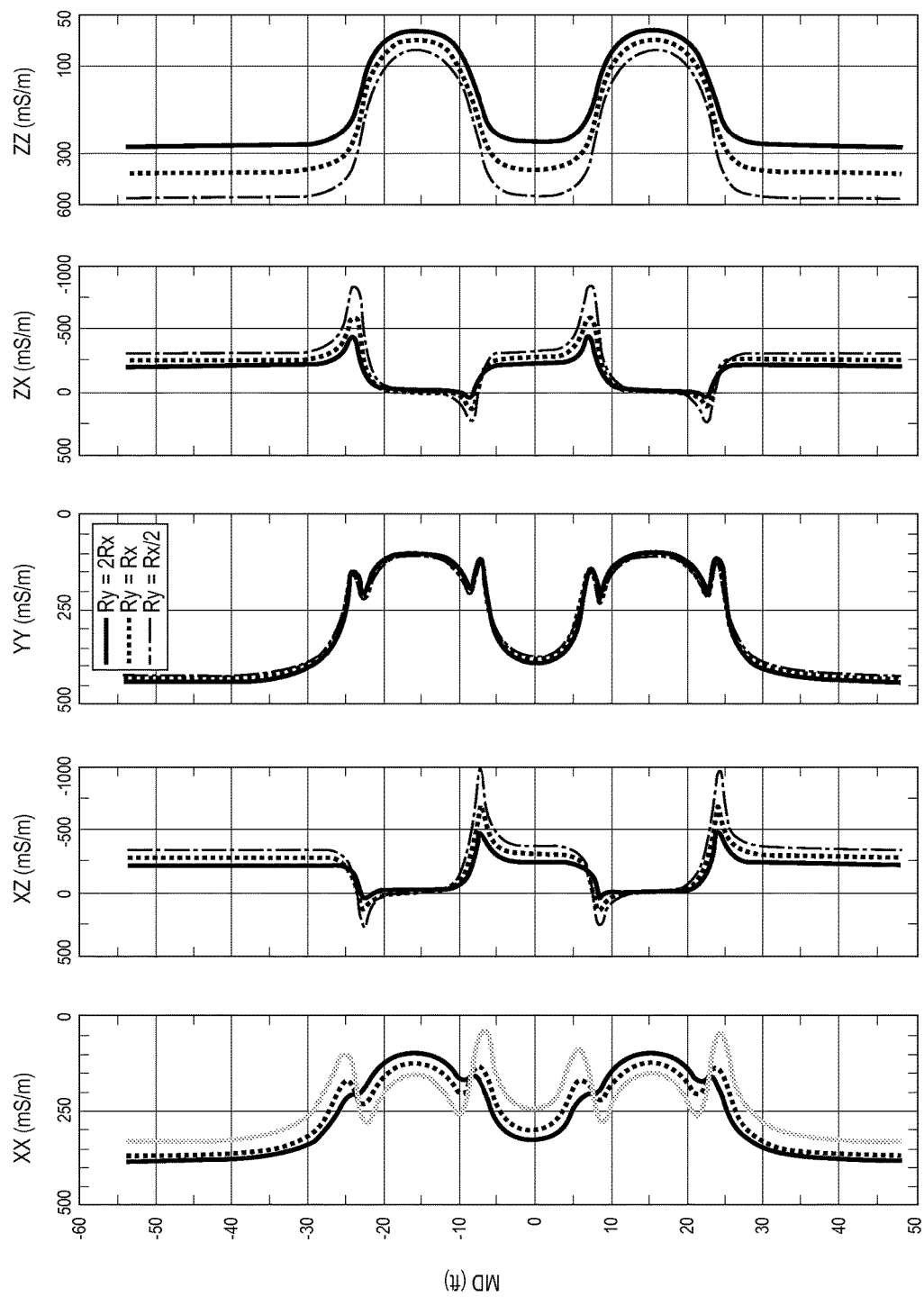
FIG. 10 is a set of graphs corresponding to those of FIG. 9, but for a different subarray of the MCI measurement tool (here, subarray A4). The graphs of FIG. 10 thus shows a comparison of simulated XX, XZ, YY, ZX, and ZZ logs for three different Rxy values of triaxial subarray A4 at a frequency of 12 kHz for a fully 3D model consistent with that of FIG. 8.
Figure 11:
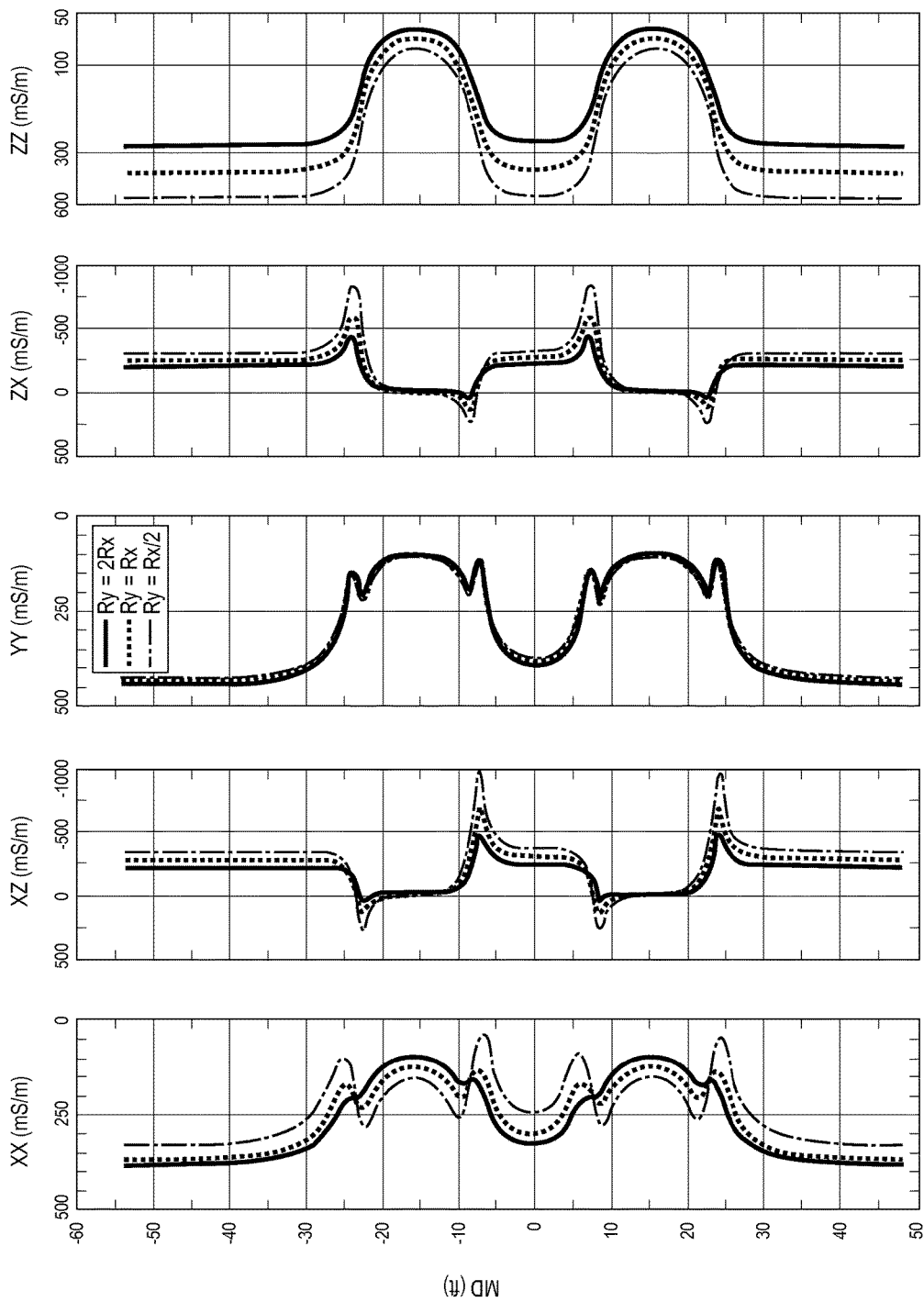
FIG. 11 is a set of graphs showing a comparison of simulated XX, XZ, YY, ZX, and ZZ logs for three different Rxy values of a particular tool subarray (here, subarray A2) at 12 kHz for a fully 3D model in accordance with the one or more example embodiments shown in FIG. 8.

FIGS. 9-11 present compared results of simulated MCI 5-component logs for three different Rxy values of subarrays A4, A3, and A2, at a frequency of 12 kHz. As shown in FIGS. 6 and 7, all nine components in FIGS. 9-11 also display good sensitivity to the biaxial anisotropy, but components of XX, XZ, ZX, and ZZ are better than the other components, such as, for example, YY. For this reason, the difference (XX−YY) or (XX−YY)/(XX+YY) can be used to detect existence of biaxial anisotropy in formations. Keep in mind here that other non-BA factors also make the contribution to this difference, such as, for example, borehole effect, shoulder-bed effect and formation dipping. For other arrays at different frequencies, similar response features for the different Rxy values are observed. In addition, components XY, YX, YZ, and ZY are smaller than the other components but they are not equal to zero. This is due to the borehole, tool-eccentricity and bed-boundary effects. The combined signals (XY+YX) and (YZ+ZY) are very close to zero and can mostly be ignored for practical applications. Therefore, this feature is used to estimate the azimuth/strike of the principal axes (xf and yf) in the bedding plane.

Real-Time Data Processing Workflow Based on BA Models

Figure 12:
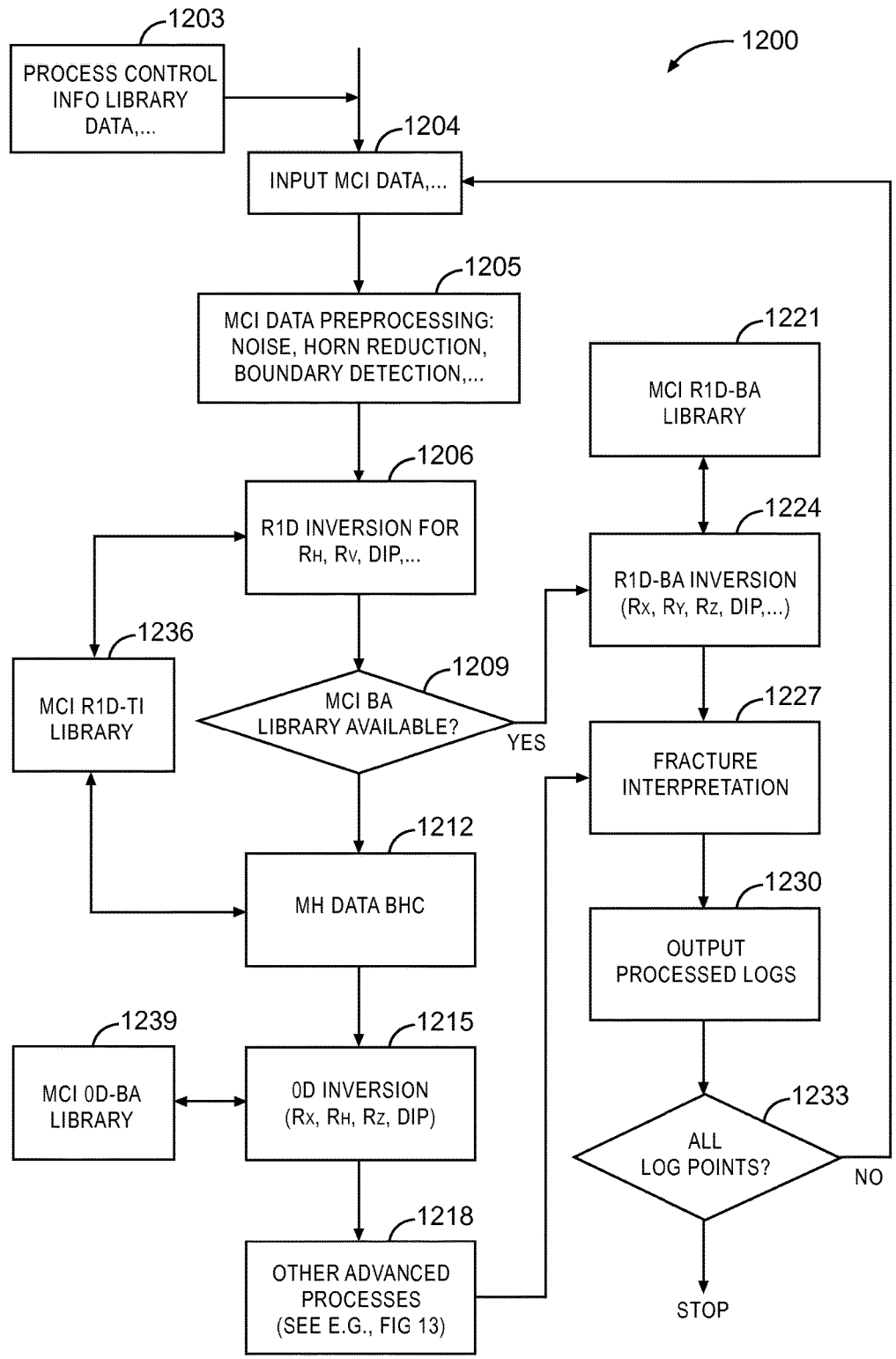
FIG. 12 is a schematic flowchart of a method comprising a multi-level workflow of MCI data processing based on multiple forward models for determining triaxial resistivity components and fracture substantially in real-time, according to one or more example embodiments.

FIG. 12 shows an example flow chart of a processing method 1200 comprising multi-level data processing and interpretation based on multiple forward models with BA and TI anisotropies, using MCI measurements. The method 1200 provides for real-time determination of formation horizontal and vertical resistivities (Rx, Ry, and Rz), dip, strike/azimuth, and fracture evaluation (identification and quantification).

At operation 1204, MCI measurement data captured by a triaxial MCI tool in a borehole extending through a subsurface geological formation is inputted after calibration, temperature correction and other preprocessing. This preprocessing does not include skin-effect correction. Other inputs into processing library data (e.g., R1D-TI, R1D-BA, and 0D-BA, corresponding respectively to items 1236, 1221, and 1239 in FIG. 12), and process-control information, at operation 1203. The MCI data may be multi-frequency data, and may be taken at multiple spacings. In some embodiments, the MCI measurement data can be single-frequency measurements for the respective arrays of the tool.

Operation 1203 comprises raw data quality evaluation, and reduction of high-frequency noise effects on raw log data using adaptive low-pass filtering techniques; calculation of combined-log signals; determination of bed boundaries; and vertical resolution enhancement. Again, the operations at 1203 in one or more example embodiments exclude correcting for skin effects. In this embodiment, none of the pre-processing operations are multi-frequency operations (as is typically the case with correcting for skin effects), so that any and all of the preprocessing operations can be performed with respect to log data captured at a single frequency.

Operation 1206 comprises R1D inversion comprising an iterative operation using the R1D-TI library 1236 for calculating best fit values for formation Rh, Rv, dip, strike/azimuth, and tool position in a hole. The values thus calculated for the inverted TI parameters for the formation. If the R1D model is of BA anisotropy, then the resultant inverted BA parameters are a substantially equivalent solution to the true model.

At operation 1209, it is established whether or not pre-calculated library data for an R1D-BA formation model is available. If so, a R1D-BA inversion is performed at operation 1224. If not, a 0D-BA operation is performed, at operation 1215.

Figure 13:
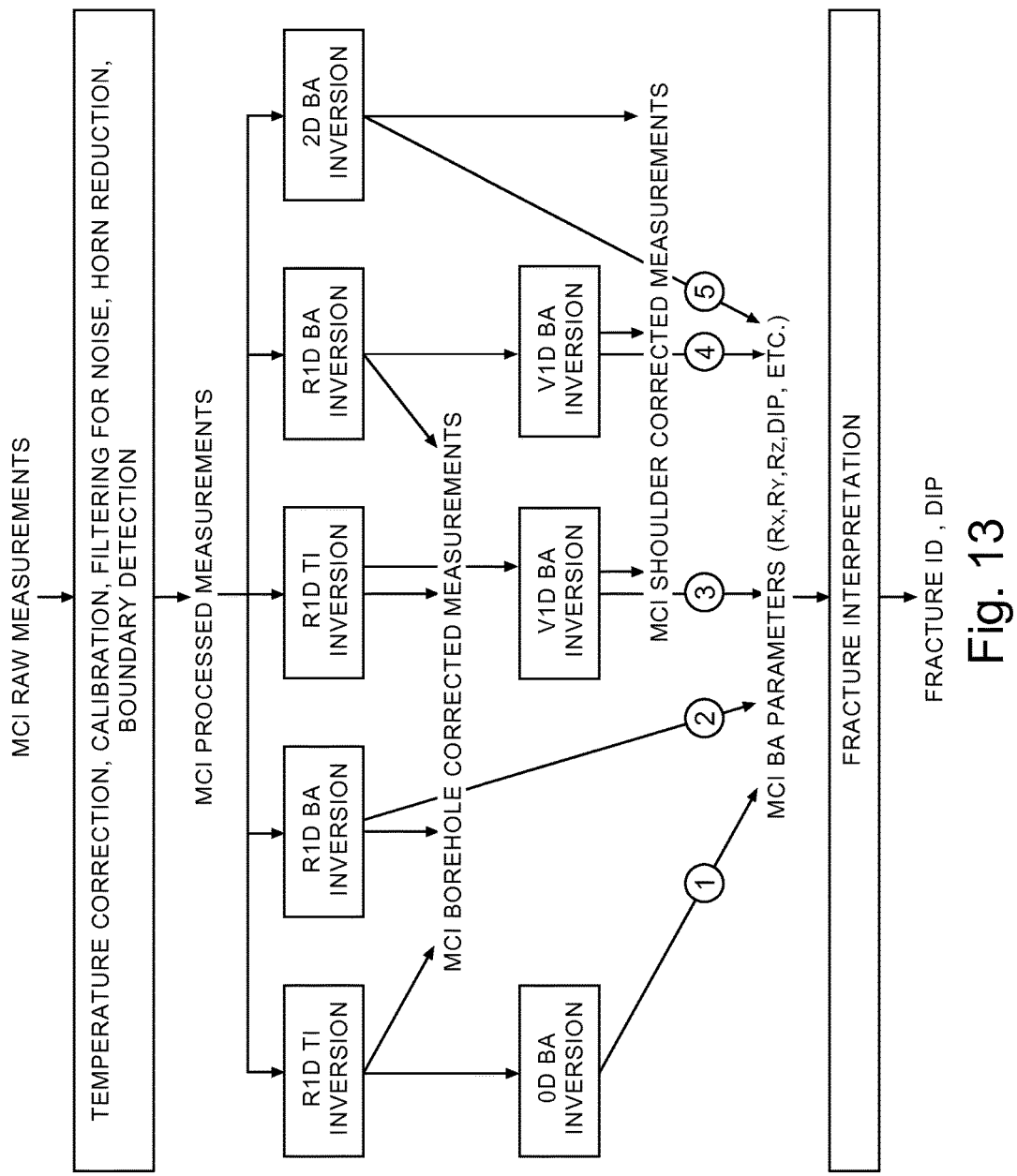
FIG. 13 is a generalized flow chart schematically illustrating five different BA resistivity and fracture inversion schemes that may be used in one or more example embodiments.

In this example embodiment, the 0D-BA inversion is preceded by computing MCI borehole effects, at operation 1212, to provide MCI borehole corrected measurement data. In operation 1212, at least some of the inverted TI parameters are used to correct the MCI measurement data for borehole effects. At operation 1215, 0D inversion is performed based on the 0D-BA library 1239, thereby recovering inverted BA formation parameters Rx, Ry, Rz, dip, and strike/azimuth. In some embodiments, other processing may be performed, such as, for example, V1D TI/BA inversion. Refer in this regard to FIG. 13.

If the R1D-BA 1221 library is available, R1D inversion is performed, at operation 1224, based on the R1D-BA library 1221 for determination of the BA formation Rx, Ry, Rz, dip, and strike/azimuth.

Operation 1227 comprises performance of fracture interpretation (detection/identification and quantification) from the raw data and processed logs based on the relevant different forward models (TI and BA models). At operation 1230, the processed results are outputted for other applications at one log point (e.g., different petrophysical applications). Operation 1233 comprises checking if all log points are processed. If yes, end all processing; if not, go to the next log point for the above processing.

Generalized Flow Chart

FIG. 13 shows a generalized flow chart for the disclosed BA resistivity inversion and fracture interpretation scheme. Five different embodiments of respective processing step combinations are shown in FIG. 13, with different numbers in circles used to enumerate different embodiments.

MCI raw measurements are input to temperature correction, calibration, filtering, horn reduction and boundary detection steps, which produce the processed MCI measurements. Again, note that these preprocessing operations be performed based on a single-frequency measurement set, and does not include skin-effect correction.

The processed measurements are then fed into one of the five different algorithms steps which perform a borehole correction on the measurements. The borehole correction removes the effect of the presence of the borehole from the measurements. In this case, two different approaches can be taken, namely:

(a) an approximate approach of using TI-based R1D; or (b) a BA-based R1D, which not only can remove the borehole effect from the measurement, but also produces the BA anisotropy parameters—Rx, Ry, Rz, anisotropy dip and anisotropy azimuth.

As a second step, shoulder effects can be removed by either using a V1D inversion, or 2D inversion. Note that some embodiments may provide for performance of more than one of these five example inversion schemes (for example, in parallel).

The first illustrated inversion scheme of FIG. 13 comprises an R1D-TI inversion (from which MCI borehole corrected measurements are calculated) followed by a 0D-BA inversion that produces inverted BA parameters (Rx, Ry, Rz, dip, etc.) to be used for fracture interpretation. The second illustrated inversion scheme comprises an R1D-BA inversion that excuses the inverted BA parameters, and by which MCI borehole corrected measurements calculated. The third illustrated inversion scheme comprises an R1D-TI inversion (to calculate MCI borehole corrected measurements) followed by a V1D-BA inversion that produces inverted BA parameters and from which MCI shoulder corrected measurements are calculated. The fourth illustrated inversion scheme comprises an R1D-BA inversion (by which MCI borehole corrected measurements are calculable) followed by a V1D-BA inversion that produces inverted BA parameters and from which MCI shoulder corrected measurements are calculated. The fifth illustrated inversion scheme of FIG. 13 comprises a 2-D-BA inversion to calculate MCI shoulder corrected measurements and produce inverted BA parameters.

Thereafter, the calculated BA formation anisotropy parameters are input to the fracture identification process which is detailed next. Again, multiple processing steps or inversion schemes as illustrated can be used together.

Fracture Identification and Quantification

From the above discussions, it can be seen that the BA resistivity parameters are the most direct information for fracture identification and quantification. At the same time, there may be other non-fracture factors leading to the formation BA anisotropy. To reduce the risk for the fracture evaluation, we use BA anisotropy combined with other related information. In this embodiment, fracture identification and quantification, comprises two basic steps: (1) determining if a fracture exists using both the MCI measurements and its processed logs; and (2) if the fracture is present around the wellbore, estimating its effective azimuth and dip from the MCI (raw and processed) data. We use the following different information for identifying the presence of fractures:

$$x_1 = \frac{2|R_x - R_y|}{R_x + R_y}, x_1^{(min)} \leq x_1 \leq x_1^{(max)}, \tag{1}$$

here $x_1^{(min)}$ and $x_1^{(max)}$ are the min and max values of the valuable $x_1$, and then let $f_1(x_1)$ as the ID function for determining the possibility of the fracture existence by using Rx and Ry recovered from the BA-model processing, $f_1(x_1^{(min)})=0$, $f_1(x_1^{(max)})=1$; moreover, the ID function $f_1(x_1)$ can be defined by $f_1(x_1)=x_1$ or $f_1(x_1)=\frac{1}{2}[1+\tan h(x_1)]$.

$$x_2 = \frac{2|XX-YY|}{|XX|+|YY|}, x_2^{(min)} \le x_2 \le x_2^{(max)}, \qquad (2)$$

here $x_2^{(min)}$ and $x_2^{(max)}$ are the min and max values of the valuable $x_2$, and then let $f_2(x_2)$ as an identification (ID) function for the possibility of the fracture existence by using XX and YY log responses at azimuth=0 degree, $f_2(x_2^{(min)})=0$, here it means the possibility of the fracture existence is zero (or there is no fracture existence), $f_2(x_2^{(max)})=1$, here it means the possibility of the fracture existence is 1 (the maximum possibility of the fracture existence); moreover, the ID function $f_2(x_2)$ can be defined by $f_2(x_2)=x_2$ or $f_2(x_2)=\frac{1}{2}[1+\tan h(x_2)]$ following the variable $x_1$ logic. The log responses 6X and YY used in this component or version of the identification function is in some example embodiments borehole corrected and/or shoulder corrected MCI measurements, shown in FIG. 13. For example, the MCI processed measurements may be corrected for borehole effects using the results of RID (TI or BA) inversion, and/or may be corrected for shoulder effects using the results of V1D-BA inversion.

$$x_3 = \frac{2|dip^{(TI)} - dip^{(BA)}|}{[dip^{(TI)} + dip^{(BA)}] + \varepsilon_{dip}} \text{ or } x_3 = dip^{(TI)}, \qquad (3)$$

$$x_3^{(min)} \le x_3 \le x_3^{(max)},$$

here $dip^{(TI)}$ and $dip^{(BA)}$ are the formation dips recovered from the TI-model and BA-model processing, $\varepsilon_{dip}$ is a very small constant great than zero for the purpose of preventing the denominator being zero, $x_3^{(min)}$ and $x_3^{(max)}$ are the min and max values of the valuable $x_3$, and then let $f_3(x_3)$ as the ID function for determining the possibility of the fracture existence by using $dip^{(TI)}$ or both $dip^{(TI)}$ and $dip^{(BA)}$, $f_3(x_3^{(min)})=0$, $f_3(x_3^{(max)})=1$; moreover, the ID function $f_3(x_3)$ can be defined by $f_3(x_3)=x_3$ or $f_3(x_3)=\frac{1}{2}[1+\tan h(x_3)]$.

$$x_4 = \frac{2|R90 - R10|}{R90 + R10}, \qquad (4)$$

$$x_4^{(min)} \le x_4 \le x_4^{(max)},$$

here $x_4^{(min)}$ and $x_4^{(max)}$ are the min and max values of the valuable $x_4$, and then let $f_4(x_4)$ as the ID function for determining the possibility of the fracture existence by using the separation between the conventional logs R90 and R10 which are obtained by the conventional induction data processing, $f_4(x_4^{(min)})=0$, $f_4(x_4^{(max)})=1$; moreover, the ID function $f_4(x_4)$ can be defined by $f_4(x_4)=x_4$ or $f_4(x_4)=\frac{1}{2}[1+\tan h(x_4)]$. Again, the lock data used for calculating the value for this function may in some example embodiments comprise MCI data corrected for borehole and/or shoulder effects based on one or more inversion operations.

$$x_5 = ||Misfit^{(TI)}| - |Misfit^{(BA)}||,$$

where $Misfit^{(TI)}$ is the residual error in the inversion when the TI medium is assumed, and $Misfit^{(BA)}$ is the residual error when the BA medium is assumed.

According to the above discussion about the different ID functions, the final ID functions for the detection of the fracture existence can be derived by combing the five mentioned ID functions:

$$F_{ID}(\overline{X}) = \sum_{k=1}^{5} w_k f_k(x_k),$$

where $\overline{X}=(x_1,x_2,x_3,x_4,x_5)^T$ and $w_k$ are the weight coefficients for different ID function $f_k(x_k)$, and $$\sum_{k=1}^{5} w_k = 1, 0 \le w_k \le 1.$$

The various weight coefficients can in some embodiments differ from one another in order to give greater weight to some components of the identification function. These which the efficiency may differ between different embodiments, for example based on user preferences or on the characteristics of particular formations or particular measurement systems. In some embodiments, for example, graduates may be given to ID function components that are based on higher-quality data, such as $x_1$ based on Rx and Ry.

In some embodiments, only some of the ID function components are used for fracture identification. This may, for example, depend on parameter availability and/or user preferences. For example, if only the valuable $x_1$ is used to define the final ID, then $w_1=1$, $w_2=w_3=w_4=w_5=0$ and $F_{ID}(\overline{X})=f_1(x_1)$, Or $F_{ID}(\overline{X})=\min[f_1(x_1),f_2(x_2),f_3(x_3),f_3(x_4),f_3(x_5)]$, Or $$F_{ID}(\overline{X}) = \prod_{k=1}^{5} f_k(x_k).$$

It can be seen that the ID function $F_{ID}(\overline{X})$ satisfies inequity equation: $0 \le F_{ID}(\overline{X}) \le 1$. Once all necessary cut-off values or threshold values for different variables are determined, the ID function $F_{ID}(\overline{X})$ may be used to determine if fractures exists near the wellbore. Moreover, the data employed in these operations may comprise both wireline and LWD data, acoustic logs, imager data, formation testers, and more for combined analysis to reduce the risk of incorrect fracture evaluation.

Cutoff values or threshold values for the identification function may be custom selected by an operator, or can be established with reference to known fracture occurrences. Such thresholds values can thereafter be used for fracture identification. For example, calculated or inverted formation parameters that result in an above-threshold value for the identification function can automatically be interpreted as indicating presence of a fracture. Conversely, it can be estimated that no fracture is present in a formation if the value of the identification function calculated based on MCI measurement data captured in the formation is lower than the threshold value. For example, if the threshold value is determined or selected to be 0.25, an identification value of 0.3 is interpreted as indicating fracture presence, while identification value of 0.2 is interpreted as indicating the absence of a fracture in the formation. These operations may, for example, being performed in automated fashion by the fracture identification module 1917 of FIG. 19.

Note that, while calculation of the identification function value can in one or more embodiments be based on all five components of the identification function as described above (e.g., $x_1 \ldots x_5$) a subset of these components may in one or more embodiments be used in calculating the identification function value. Selection of the particular components of the identification function which is to be used in a particular instance may be based on whether or not the respective parameters of the different components are available, which may in some instances depend on which inversion schemes have been executed.

If the presence of fractures near the wellbore has been detected by use of the identification function, the method may further include estimating the fracture strike/azimuth and dip. Such fracture strike/azimuth and dip estimation may again be performed in automated fashion by one or more computer processors configured to do so, e.g., by the hardware-implemented fracture identification module 1917 of FIG. 19. In one or more example embodiments, automated fracture parameter estimation may be performed based on the principles for fracture characterization set out in the following description.

Figure 14:
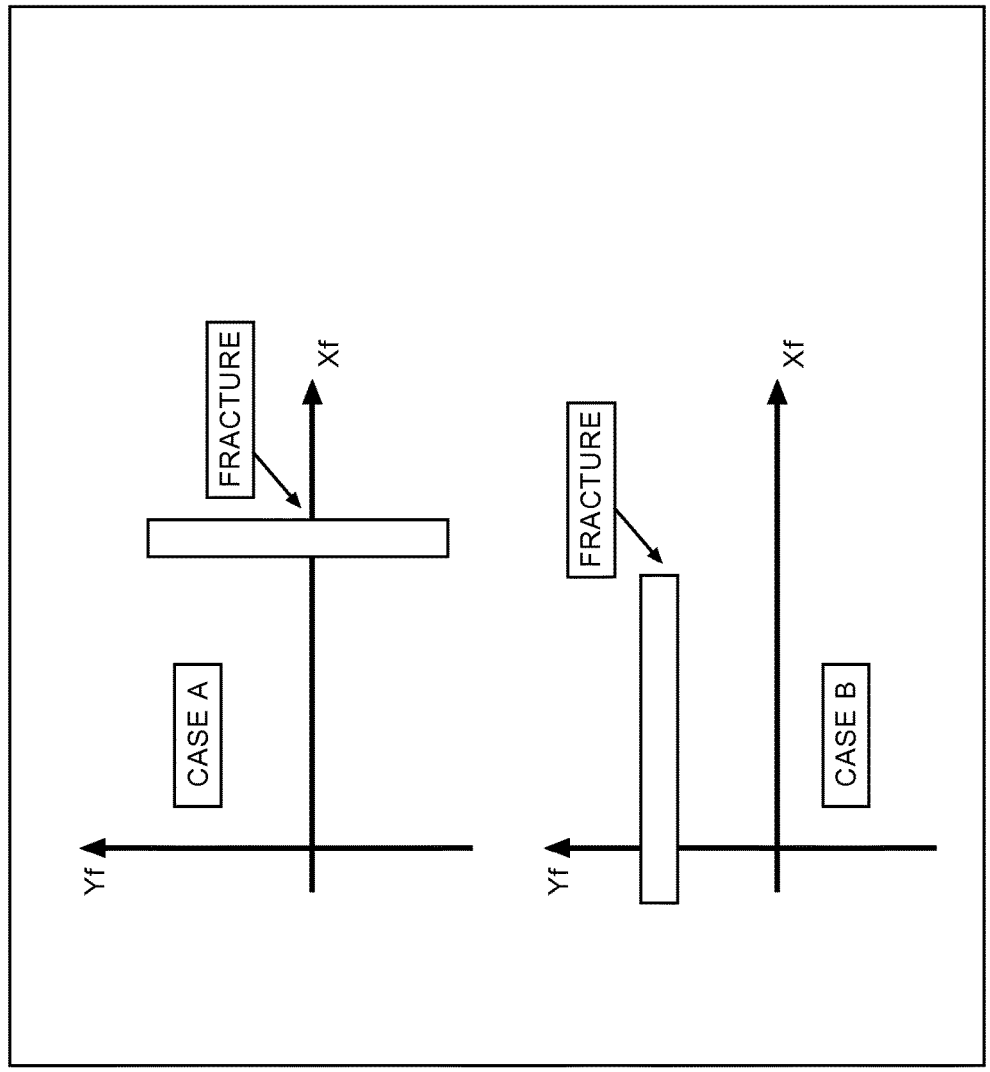
FIG. 14 shows a pair of schematic diagrams representing fracture strike in a formation bedding plane (represented as the X-Y plane) in respective example cases of a method for estimating fracture strike/azimuth from a known strike/azimuth of the formation's principal X-axis. Here, the X- and Y-axis are the two principal axes in a formation bedding plane (plane X-Y).
Figure 15:
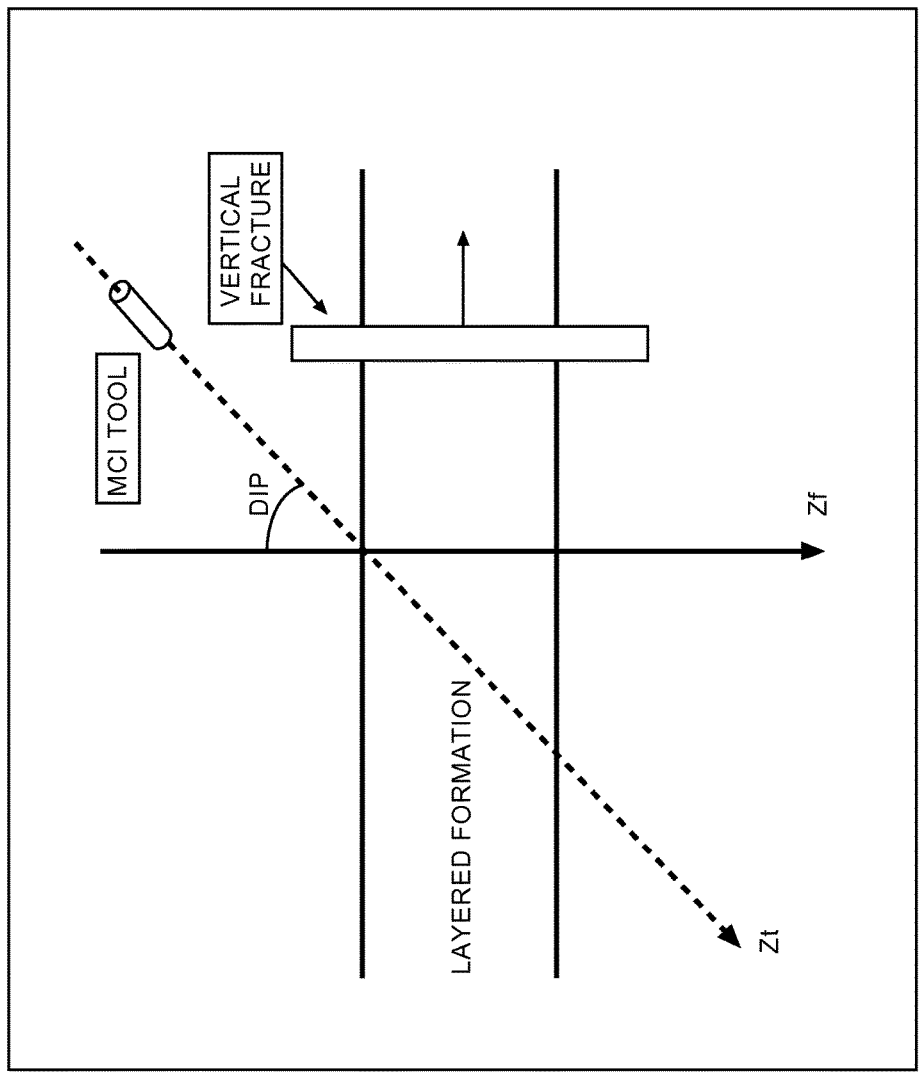
FIG. 15 is a schematic diagram applicable to a method for estimating a fracture's relative dip from a known formation dip, one or more example embodiments.

Assume that the fracture is perpendicular to the bedding plane (see FIG. 15) and it is filled with oil-based mud or resistive hydrocarbons. Therefore, the fractured-formation resistivity is biaxially anisotropic and can be expressed as a diagonal tensor in the principal-axis coordinate system, and the direction of its maximal resistivity principal value in the x-y plane will be normal to the fracture plane (see cases A and B in FIG. 14). Hence the fracture strike/azimuth can be estimated by using the following two equations:

$$\text{Fracture strike/azimuth} = 90° + x\text{-axis strike, if } Rx > Ry \quad (1)$$

(here, Rx and Ry are recovered by the above inversion); and $$\text{Fracture strike/azimuth} = x\text{-axis strike, if } Rx < Ry \quad (2)$$

(here, the x-axis strike/azimuth is determined by the above R1D/0D inversion).

Hence the fracture relative dip can be estimated by using the following equation:

$$\text{Fracture dip} = 90° - \text{dip},$$

where dip is the known formation relative dip inverted from the R1D-BA/0D-BA processing. Moreover, if the $F_{ID}(\overline{X})$ is less than the predetermined cutoff value, just assign both fracture strike/azimuth and its dip a null or empty value such as −9999.

In addition, the effective fracture length along the log profiles can be estimated by using the log curve of the final ID function $F_{ID}(\overline{X})$.

Example Inversion Results

Figure 16:
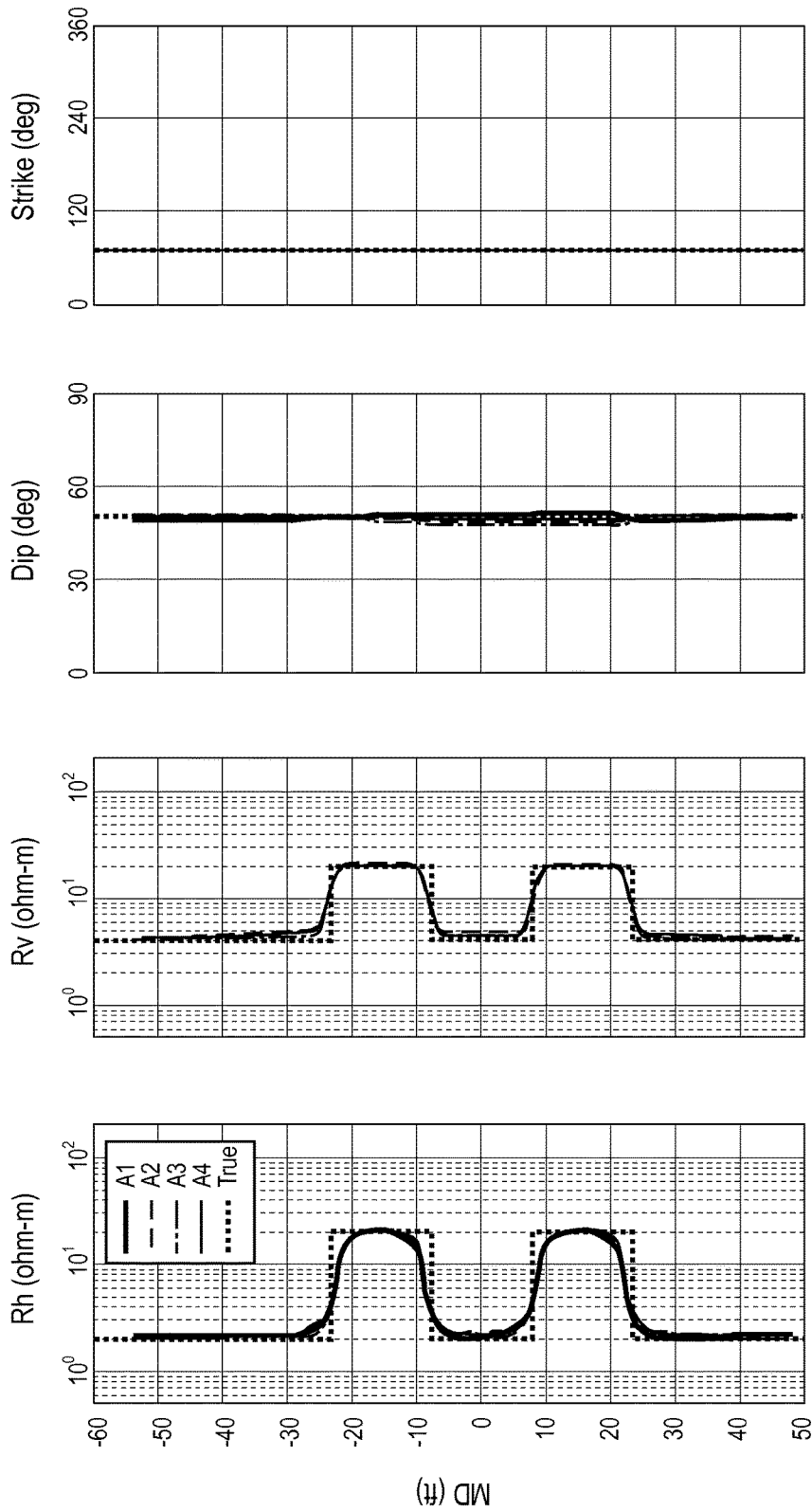
FIG. 16 shows a set of graphs showing recovered formation horizontal resistivity (Rh), vertical resistivity (Rv), dip, and strike using RID inversion based on a transversely isotropic (TI) formation model for a formation corresponding substantially to the example embodiment of FIG. 8, where Rxy=1 and where layers 1, 3, and 5 are TI anisotropic.

Some inverted results based on the TI-model inversion and the BA-model inversion will now be present. FIG. 16 presents the recovered Rh, Rv, dip, and strike by using the RID inversion based on the TI model. The true model is shown in FIG. 8 (Rxy=1), where layers 1, 3, and 5 are of the TI anisotropy. Note that the inverted results (all solid lines) agree well with the true model (all dashed lines).

Figure 17:
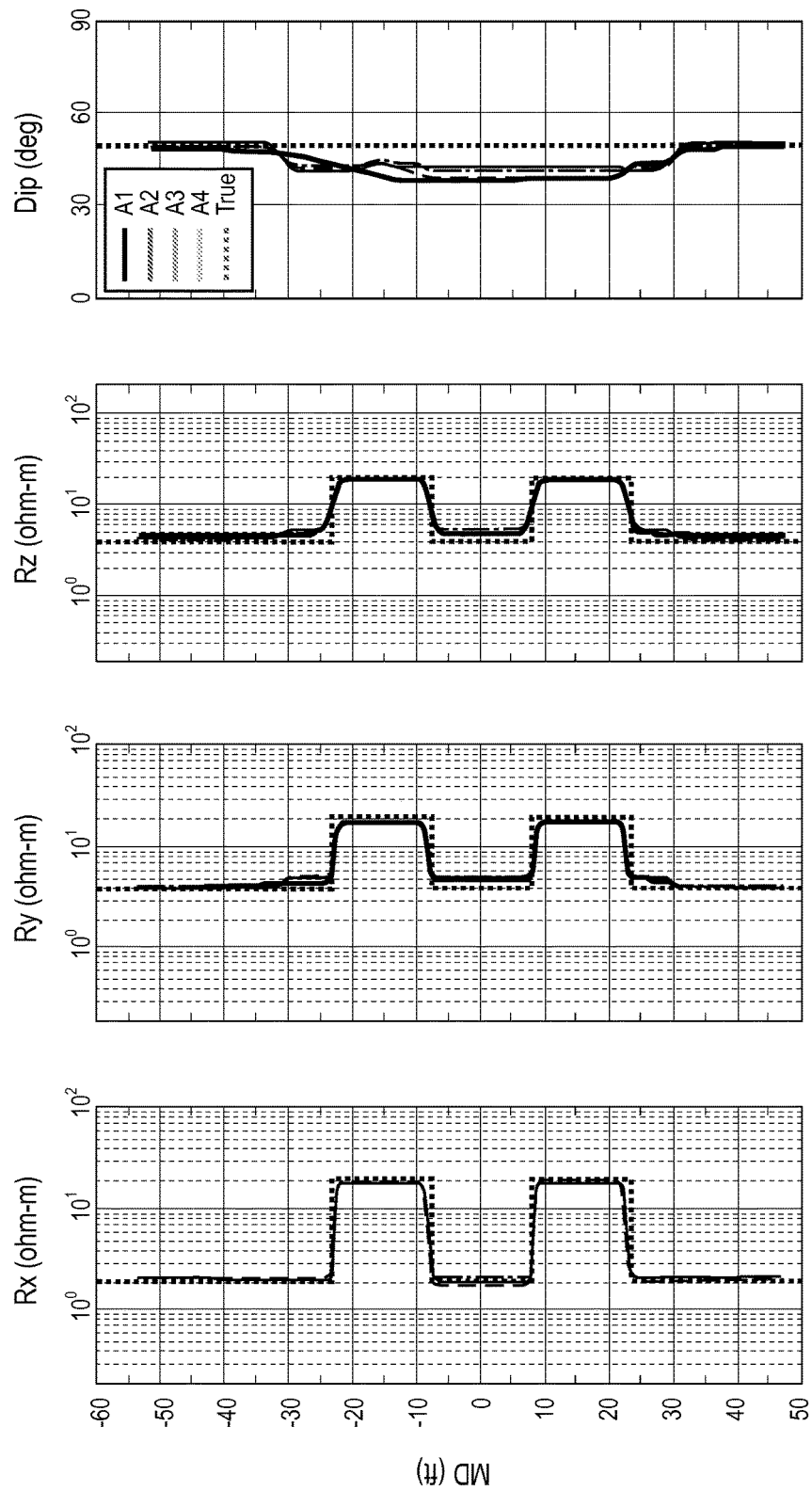
FIG. 17 shows an example embodiment of recovered Rx, Ry, Rz, dip, and strike using zero-dimensional (0D) inversion based on a biaxially anisotropic (BA) formation model that accounts for transverse biaxial anisotropy for a formation corresponding substantially to the example embodiment shown in FIG. 8, where Rxy=Rx/Ry=2, and where layers 1, 3, and 5 are BA anisotropic.
Figure 18:
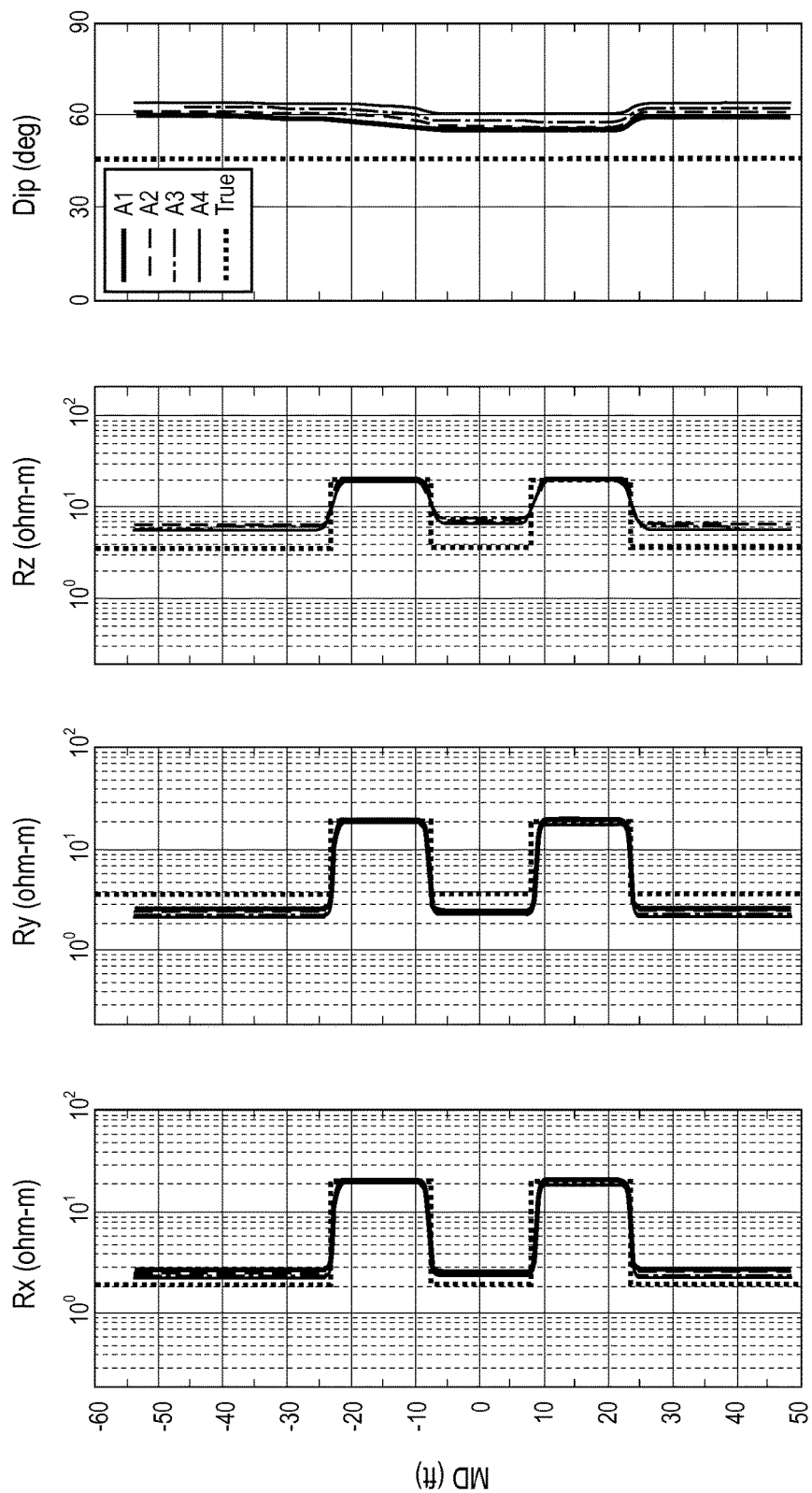
FIG. 18 shows an example embodiment of recovered Rx, Ry, Rz, dip, and strike using 0D inversion based on a TI model rather than the BA model used for FIG. 17. The true model is shown in FIG. 8. The model a BA model substantially accordance with the example embodiment shown in FIG. 8, where Rxy=2, and where layers 1, 3, and 5 are BA anisotropic.

In FIG. 8, let Rxy=2 for layers 1, 3, and 5, and so they are of the BA anisotropy model. FIG. 17 presents the recovered Rx, Ry, Rz, and dip by using the 0D inversion based on the BA model. From the inverted results, observe that the inverted results (all solid lines) generally agree well with the true model (all dashed lines), especially for the inverted Rx, Ry, and Rz. For comparison purposes, the recovered Rh (Rx, Ry), Rz, and dip by using the 0D-TI inversion are presented in FIG. 18. From the inverted results shown in FIG. 18, all recovered parameters are clearly inaccurate, except for two isotropic sections. For example, a high dip up to 65 degrees is incorrectly recovered but it is known that the true dip is only 50 degrees. Besides the ratio Rxy for directly indicating the formation BA anisotropy and then fractures, note that the sizable difference between the two dip results from the 0D-BA and 0D-TI inversions can also indicate the existence of BA anisotropy, leading to detection of fracture presence.

Retrospective Overview

It will be seen that some aspects of the above-described embodiments provide a method comprising:

accessing multicomponent induction (MCI) measurement data indicative of resistivity measurements captured by a measurement tool in a borehole extending through a subsurface formation;

in an automated procedure using one or more computer processors, calculating inverted biaxial anisotropy (BA) parameters by performing an iterative BA inversion operation based on the MCI measurement data using a BA formation model that represents simulated formation resistivity characteristics that account for transverse biaxial formation anisotropy to resistivity; and operating a controlled device based at least in part on the inverted BA parameters.

In one or more embodiments, the performing of the BA inversion operation is based on single-frequency MCI measurement data. The inverted BA parameters may in some embodiments be calculated from raw MCI measurement data, without correcting the measurement data for skin effects using multifrequency MCI measurement data. In such cases, the calculating of the inverted BA parameters may comprise performing a set of processing operations that comprises at least the BA inversion operation, the set of processing operations excluding any non-inversion operation to correct for borehole skin effects using multi-frequency MCI measurement data.

The controlled device comprises a display device to display one or more formation characteristics based at least in part on the inverted BA parameters. Instead, or in addition, the controlled device may comprise a control mechanism for controlling mechanism for borehole measurement, drilling, and/or development based at least in part on formation characteristics calculated based on the inverted BA parameters.

The BA formation model may in some example embodiments be a radially one-dimensional model (R1D-BA) accounting for biaxial anisotropy to resistivity. The method may in such cases include performing a second BA inversion operation based at least in part on the MCI measurement data and using a second BA formation model. In some example embodiments, the second BA formation model is a vertically one-dimensional model (V1D-BA) accounting for biaxial anisotropy to resistivity, in which case the method may further comprise calculating shoulder-corrected formation parameters based on performance of the second inversion operation.

Instead, or in addition, the BA formation model may be a two-dimensional model (2D-BA) accounting for biaxial anisotropy to resistivity.

In addition to the BA inversion operation, the method may in some embodiments further comprise calculating inverted transverse isotopy (TI) parameters by performing an iterative transverse isotopy (TI) inversion operation based on the MCI measurement data using a TI formation model that represents simulated formation resistivity characteristics that account for transverse formation isotropy to resistivity. The TI formation model may be a radially one-dimensional model (R1D-TI) that accounts for transverse isotropy to resistivity. In such cases, the method may comprise calculating, based at least in part on the inverted TI parameters, MCI borehole corrected measurement data by processing the MCI measurement data to correct for borehole effects. The method may thus comprise correcting the MCI measurement data for borehole effects based on an inversion operation using a radially one-dimensional formation model.

The BA formation model may be a vertically one-dimensional model that accounts for biaxial anisotropy to resistivity (V1D-BA). In such cases, the performing of the BA inversion operation may based at least in part on the inverted TI parameters. In some embodiments, the method may comprise calculating shoulder-corrected MCI measurement data based on an inversion operation using a vertically one-dimensional formation model.

In some embodiments, the BA formation model The is a zero dimensional model that accounts for biaxial formation anisotropy (0D-BA), the 0D-BA assuming a homogenous unbounded formation which is biaxially anisotropic in resistivity. In other embodiments, the BA formation model may be a R1D-BA model.

The method may further comprise performing automated fracture analysis to identify one or more formation fracture properties of the subsurface formation based at least in part on one or more of the inverted BA parameters. In some embodiments, the automated fracture analysis comprises identifying presence of a fracture in the formation by calculating a value of an identification function based on at least some formation parameters calculated based on the MCI measurement data, the identification function being variable as a function both of a particular one of the inverted BA parameters and a particular one of the inverted TI parameters.

The above-described example embodiments also provide for a system comprising a data access module to access multicomponent induction (MCI) measurement data indicative of resistivity measurements captured by a measurement tool in a borehole extending through a subsurface formation; and an inversion module that comprises one or more computer processors to calculate inverted biaxial anisotropy (BA) parameters by performing an iterative BA inversion operation based on the MCI measurement data using a BA formation model that represents simulated formation resistivity characteristics that account for transverse biaxial formation anisotropy to resistivity.

The system may further comprise a fracture identification module to perform an automated fracture detection operation for determining presence of a fracture in the formation, the automated fracture detection operation being based at least in part on the inverted BA parameters. In one or more embodiments, the inversion module is configured to perform an additional inversion operation, the BA inversion operation and the additional inversion operation being a pair of operations performable by the inversion module and selected from the group comprising:

(a) a radially one-dimensional inversion based on formation transverse isotropy (R1D-TI) and a zero dimensional inversion based on formation biaxial anisotropy (0D-BA);

(b) a R1D-TI inversion and a vertically one-dimensional inversion based on formation biaxial anisotropy (V1D-BA); and (c) a radially one-dimensional inversion based on formation biaxial anisotropy (R1D-BA) and a V1D-BA inversion.

Note that the above-referenced described method operations apply mutatis mutandis to the corresponding system elements, and vice versa. The above-described example embodiments further provide for a computer readable storage medium having stored thereon instructions for causing a machine, in response to execution of the instructions by the machine, to perform operations comprising:

accessing multicomponent induction (MCI) measurement data indicative of resistivity measurements captured by a measurement tool in a borehole extending through a subsurface formation; and in an automated procedure using one or more computer processors, calculating inverted biaxial anisotropy (BA) parameters by performing an iterative BA inversion operation based on the MCI measurement data using a BA formation model that represents simulated formation resistivity characteristics that account for transverse biaxial formation anisotropy to resistivity.

It will be seen that the above-describe example embodiments describe a real-time MCI data processing algorithm and workflow including the fracture identification and/or quantification, based on both the BA and TI models. The MCI processing scheme takes into account BA anisotropy and is accordingly able to provide more accurate BA resistivity anisotropy ($R_x$, $R_y$, and $R_z$) and formation dip. Parameter values derived from the inversion based on BA (also referred to herein as inverted BA parameters), and parameter values derived from the inversion based on the TI model (also referred to herein as inverted TI parameters) may be used in combination to evaluate fractured formations.

Benefits of the described methods and systems include real-time determination of BA formation's three resistivities $R_x$, $R_y$, $R_z$, and dip and then fracture descriptions by using the measurements and inverted data for fracture detection and estimation of its azimuth and relative dip.

Example System

Figure 19:
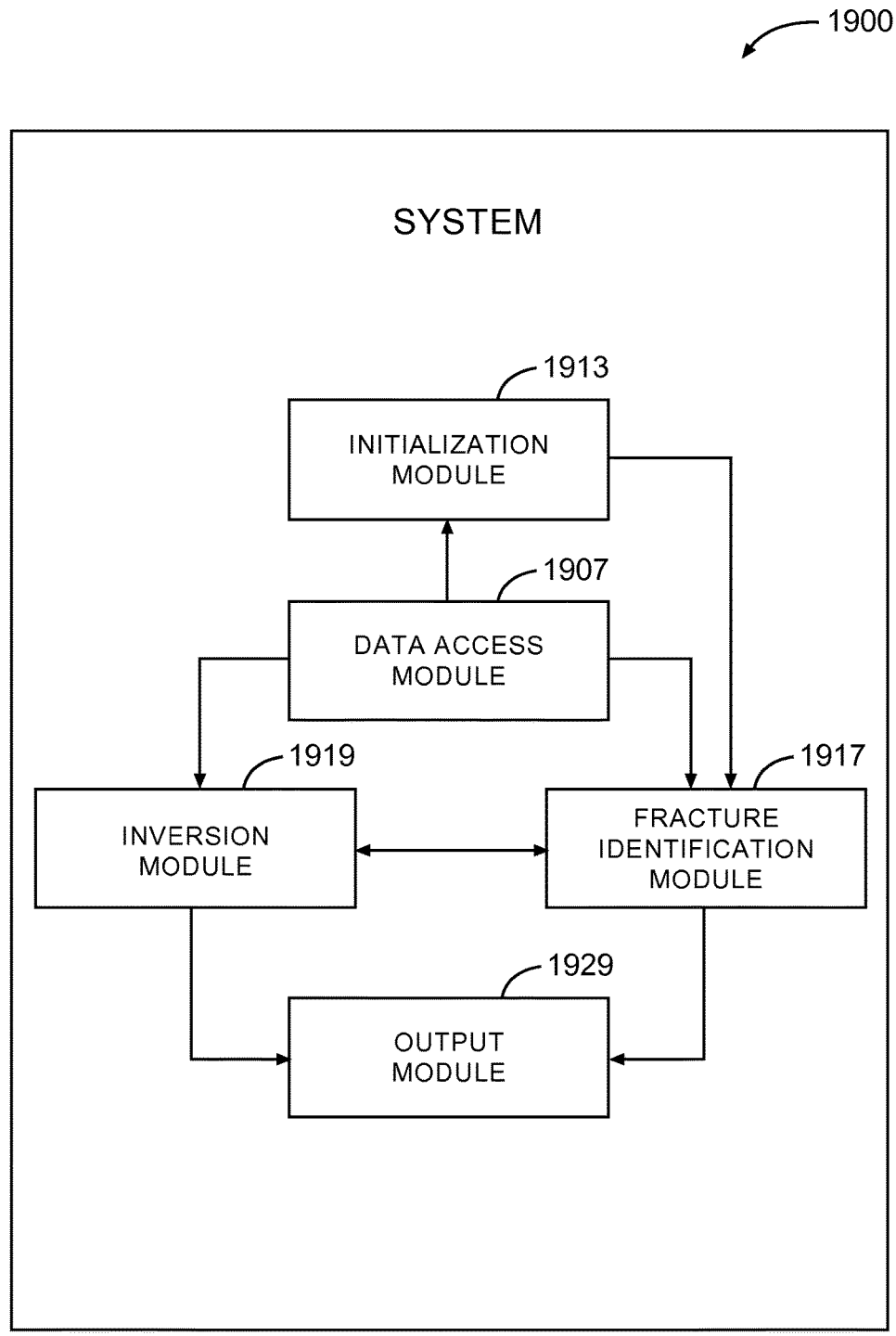
FIG. 19 is a schematic block diagram of a system for real-time evaluation of formation biaxially anisotropy, dip, and fracture using MCI measurements, according to one or more example embodiments.

FIG. 19 is a schematic block diagram of an example system 1900 for estimating subsurface formation and invasion properties, according to an example embodiment. The example system 1900 of FIG. 19 may be configured to perform one or more of the methods described above with reference to FIGS. 12 and 13. The system 1900 may comprise multiple hardware-implemented modules for performing the respective operations described previously.

In this example embodiment, the system 1900 includes a data access module 1907 configured to access MCI measurement data. An inversion module 1919 is configured to perform inversion in accordance with one or more of the example embodiments discussed with reference to FIGS. 12 and 13, while a fracture identification module 1917 is configured to identify and characterize one or more fractures based on results of the inversion, according to the fracture identifications schemes and/or formulas discussed above.

The system 1900 further comprises an output module 1929 configured to deliver the estimated measurement zone parameters. The output module 1929 may in some embodiments deliver numerical tables with estimated values for the invasion depth, formation resistivity, and invasion resistivity at multiple different points along the borehole 116. In other embodiments, a graphical plot that maps the estimated values to the borehole positions may be printed in hard copy, and/or may be displayed on a display screen.

Modules, Components, and Logic

Certain embodiments are described herein as including logic or a number of components, modules, or mechanisms. Modules may constitute either software modules, with code embodied on a non-transitory machine-readable medium (i.e., such as any conventional storage device, such as volatile or non-volatile memory, disk drives or solid state storage devices (SSDs), etc.), or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry or in temporarily configured circuitry (e.g., configured by software), may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).)

Figure 20:
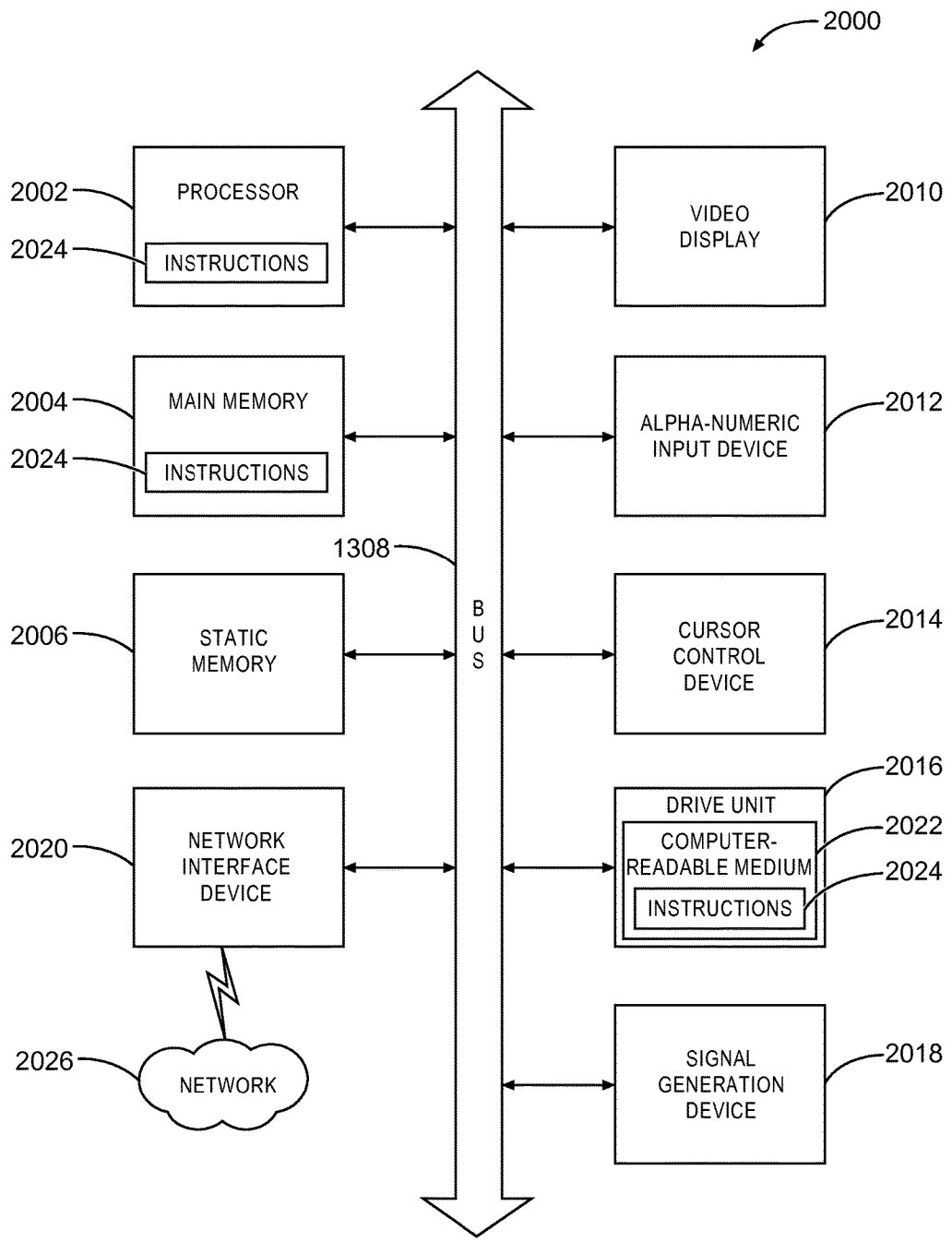
FIG. 20 is a diagrammatic representation of a machine in the example form of a computer system within which a set of instructions for causing the machine to perform a method for real-time evaluation of formation and fraction characteristics may be executed, according to one or more example embodiments.

FIG. 20 shows a diagrammatic representation of a machine in the example form of a computer system 2000 within which a set of instructions 2024 may be executed for causing the machine to perform any one or more of the methodologies discussed herein. For example, the surface computer system 366 (FIG. 3) or any one or more of its components may be provided by the system 2000.

In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2000 includes a processor 2002 (e.g., a central processing unit (CPU) a graphics processing unit (GPU) or both), a main memory 2004 and a static memory 2006, which communicate with each other via a bus 2008. The computer system 2000 may further include a video display unit 2010 (e.g., a liquid crystal display (LCD) or a cathode ray tube (CRT)). The computer system 2000 also includes an alpha-numeric input device 2012 (e.g., a keyboard), a cursor control device 2014 (e.g., a mouse), a disk drive unit 2016, a signal generation device 2018 (e.g., a microphone/speaker) and a network interface device 2020.

The disk drive unit 2016 includes a machine-readable or computer-readable storage medium 2022 on which is stored one or more sets of instructions 2024 (e.g., software) embodying any one or more of the methodologies or functions described herein. The instructions 2024 may also reside, completely or at least partially, within the main memory 2004 and/or within the processor 2002 during execution thereof by the computer system 2000, the main memory 2004 and the processor 2002 also constituting non-transitory machine-readable media. The instructions 2024 may further be transmitted or received over a network 2026 via the network interface device 2020.

While the machine-readable storage medium 2022 is shown in an example embodiment to be a single medium, the term "machine-readable medium" should be taken to include a single medium or multiple media (e.g., a centralized or distributed database and/or associated caches and servers) that store the one or more sets of instructions 2024. The term "machine-readable medium" shall also be taken to include any medium that is capable of storing a set of instructions for execution by the machine and that cause the machine to perform any one or more of the methodologies of this disclosure. The term "machine-readable medium" shall accordingly be taken to include, but not be limited to, solid-state memory devices of all types, as well as optical and magnetic media.

Although this disclosure has been described with reference to specific example embodiments, it will be evident that various modifications and changes may be made to these embodiments without departing from the broader scope of the disclosure. Accordingly, the specification and drawings are to be regarded in an illustrative rather than a restrictive sense.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, disclosed subject matter lies in less than all features of a single disclosed embodiment. Thus, the following claims are hereby incorporated into the Detailed Description, with each claim standing on its own as a separate embodiment.

What is claimed is:

1. A method comprising:
    lowering a multicomponent induction (MCI) measurement tool into a borehole extending through a subsurface formation, wherein the MCI measurement tool comprises a subarray comprising a mutually orthogonal receiver triad, and wherein the mutually orthogonal receiver triad comprises a first receiver at a first axis, a second receiver at a second axis, and a third receiver at a third axis;
    producing MCI measurement data that comprises a first voltage measurement from the first receiver, a second voltage measurement from the second receiver, and a third voltage measurement from the third receiver, and wherein each voltage measurement is produced by the MCI measurement tool while the MCI measurement tool is operated at one or more frequencies;
    calculating inverted biaxial anisotropy (BA) parameters by performing an iterative BA inversion operation based on at least the first voltage measurement, the second voltage measurement, and the third voltage measurement using a BA formation model that accounts for resistivity anisotropy between a first formation principal axis and a second formation principal axis that is orthogonal to the first formation principal axis and resistivity anisotropy between a substantially vertical formation principal axis and the first formation principal axis, wherein the substantially vertical formation principal axis is orthogonal to the first and second formation principal axes;
    calculating inverted transverse isotropy (TI) parameters by performing an iterative TI inversion operation based on the MCI measurement data using a TI formation model that accounts for resistivity isotropy between the first formation principal axis and the second formation principal axis and resistivity anisotropy between the substantially vertical formation principal axis and the first formation principal axis; and
    indicating at least one of a fracture property and a fracture presence based on a difference between a formation parameter determined from one or more of the inverted BA parameters and a formation parameter determined from one or more of the inverted TI parameters.

2. The method of claim 1, wherein producing the MCI measurement data comprises capturing the MCI measurement data while the subarray of the MCI measurement tool is operated at a single-frequency.

3. The method of claim 1, wherein the BA formation model is a radially one-dimensional model (R1D-BA), wherein the radially one-dimensional model comprises a borehole model as a circular cross-section surrounded by a formation, accounting for biaxial anisotropy to resistivity.

4. The method of claim 3, further comprising performing a second BA inversion operation based at least in part on the MCI measurement data and using a second BA formation model.

5. The method of claim 4, wherein the second BA formation model is a vertically one-dimensional model (V1D-BA) accounting for biaxial anisotropy to resistivity, the method further comprising calculating shoulder-corrected formation parameters based on performance of the second BA inversion operation.

6. The method of claim 1, wherein the BA formation model is a two-dimensional model (2D-BA) accounting for biaxial anisotropy to resistivity.

7. The method of claim 1, wherein the TI formation model is a radially one-dimensional model (R1D-TI), wherein the radially one-dimensional model comprises a borehole model as a circular cross-section surrounded by a formation, that accounts for transverse isotropy to resistivity.

8. The method of claim 7, further comprising calculating, based at least in part on the inverted TI parameters, MCI borehole corrected measurement data by processing the MCI measurement data to correct for borehole effects.

9. The method of claim 7, wherein the BA formation model is a vertically one-dimensional model that accounts for biaxial anisotropy to resistivity (V1D-BA), the performing of the BA inversion operation based at least in part on the inverted TI parameters.

10. The method of claim 7, where the BA formation model is a zero dimensional model that accounts for biaxial formation anisotropy (0D-BA), the 0D-BA assuming a homogenous unbounded formation which is biaxially anisotropic in resistivity.

11. The method of claim 1, wherein indicating at least one of the fracture property and the fracture presence comprises calculating a value of an identification function based on at least some formation parameters calculated based on the MCI measurement data, the identification function being variable as a function of one or more of the inverted BA parameters and one or more of the inverted TI parameters.

12. The method of claim 1, wherein the inverted BA parameters comprise a residual error when a BA medium is assumed during inversion and the inverted TI parameters is a residual error when a TI medium is assumed during inversion.

13. The method of claim 1, further comprising calculating a ratio between a summed value and a difference value, wherein the summed value is the sum of a first log response and second log response that is orthogonal to the first log response, and the difference value is the difference of the first log response and the second log response.

14. The method of claim 1, wherein the BA inversion operation and the TI inversion operation comprises:
a radially one-dimensional inversion based on formation transverse isotropy (R1D-TI), wherein the R1D-TI comprises modeling the borehole as a circular cross-section surrounded by a formation, and a zero dimensional inversion based on formation biaxial anisotropy (0D-BA); or
a R1D-TI inversion and a vertically one-dimensional inversion based on formation biaxial anisotropy (V1D-BA).

15. The method of claim 1, wherein the MCI measurement tool comprises three mutually orthogonal collocated antennas, and wherein the MCI measurement data comprises a first electromagnetic property along the first formation principal axis, a second electromagnetic property along the second formation principal axis, and a third electromagnetic property along the substantially vertical formation principal axis.

16. The method of claim 1, wherein the formation parameter determined from the one or more of the inverted BA parameters is a first dip angle, and wherein the formation parameter determined from the one or more of the inverted TI parameters is a second dip angle.

17. A system comprising:
a multicomponent induction (MCI) measurement tool that comprises a subarray comprising a mutually orthogonal receiver triad, wherein the mutually orthogonal receiver triad comprises a first receiver at a first axis, a second receiver at a second axis, and a third receiver at a third axis;
at least one of a main memory or a static memory to store MCI measurement data captured by the MCI measurement tool in a borehole extending through a subsurface formation, wherein the MCI measurement data comprises a first voltage measurement from the first receiver, a second voltage measurement from the second receiver, and a third voltage measurement from the third receiver, and wherein each voltage measurement is produced by the MCI measurement tool while the MCI measurement tool is operated at one or more frequencies; and
a non-transitory machine-readable storage device having instructions that are executable by one or more processors to cause the one or more processors to:
calculate inverted biaxial anisotropy (BA) parameters by performing an iterative BA inversion operation based on at least the first voltage measurement, the second voltage measurement, and the third voltage measurement using a BA formation model that accounts for anisotropy between a first formation principal axis and a second formation principal axis and resistivity anisotropy between a substantially vertical formation principal axis and the first formation principal axis, wherein the substantially vertical formation principal axis is orthogonal to the first and second formation principal axes, and
calculate inverted transverse isotropy (TI) parameters by performing an iterative TI inversion operation based on the MCI measurement data using a TI formation model that accounts for resistivity isotropy between the first formation principal axis and the second formation principal axis and resistivity anisotropy between the substantially vertical formation principal axis and the first formation principal axis, and
indicate at least one of a fracture property and a fracture presence based on a difference between a formation parameter determined from one or more of the inverted BA parameters and a formation parameter determined from one or more of the inverted TI parameters.

18. The system of claim 17, wherein the BA inversion operation and the TI inversion operation comprises:
a radially one-dimensional model inversion based on formation transverse isotropy (R1D-TI), wherein the R1D-TI comprises modeling the borehole as a circular cross-section surrounded by a formation, and a zero dimensional inversion based on formation biaxial anisotropy (0D-BA); or
a R1D-TI inversion and a vertically one-dimensional inversion based on formation biaxial anisotropy (V1D-BA).

19. The system of claim 17, wherein the instructions to cause the one or more processors to indicate at least one of the fracture property and the fracture presence comprise instructions to cause the one or more processors to calculate a value of an identification function based on at least some formation parameters calculated based on the MCI measurement data, the identification function being variable as a function of one or more of the inverted BA parameters and one or more of the inverted TI parameters.

20. The system of claim 17, wherein the MCI measurement tool comprises three mutually orthogonal collocated antennas to produce the MCI measurement data, and wherein the MCI measurement data comprises a first electromagnetic property along the first formation principal axis, a second electromagnetic property along the second formation principal axis, and a third electromagnetic property along the substantially vertical formation principal axis.

21. The system of claim 17, wherein the formation parameter determined from the one or more of the inverted BA parameters is a first dip angle, and wherein the formation parameter determined from the one or more of the inverted TI parameters is a second dip angle.

22. A non-transitory computer readable storage medium having stored thereon instructions to perform operations comprising:
- lowering a multicomponent induction (MCI) measurement tool into a borehole extending through a subsurface formation, wherein the MCI measurement tool comprises a subarray comprising a mutually orthogonal receiver triad, and wherein the mutually orthogonal receiver triad comprises a first receiver at a first axis, a second receiver at a second axis, and a third receiver at a third axis;
- producing MCI measurement data that comprises a first voltage measurement from the first receiver, a second voltage measurement from the second receiver, and a third voltage measurement from the third receiver, and wherein each voltage measurement is produced by the MCI measurement tool while the MCI measurement tool is operated at one or more frequencies;
- calculating inverted biaxial anisotropy (BA) parameters by performing an iterative BA inversion operation based on at least the first voltage measurement, the second voltage measurement, and the third voltage measurement using a BA formation model that accounts for resistivity anisotropy between a first formation principal axis and a second formation principal axis and resistivity anisotropy between a substantially vertical formation principal axis and the first formation principal axis, wherein the substantially vertical formation principal axis is orthogonal to the first and second formation principal axes;
- calculating inverted transverse isotropy (TI) parameters by performing an iterative TI inversion operation based on the MCI measurement data using a TI formation model that accounts for resistivity isotropy between the first formation principal axis and the second formation principal axis resistivity and anisotropy between the substantially vertical formation principal axis and the first formation principal axis; and
- indicating at least one of a fracture property or a fracture presence based on a difference between a formation parameter determined from one or more of the BA parameters and a formation parameter determined from one or more of the TI parameters.

23. The non-transitory computer readable storage medium of claim 22, wherein the formation parameter determined from the one or more of the inverted BA parameters is a first dip angle, and wherein the formation parameter determined from the one or more of the inverted TI parameters is a second dip angle.

* * * * *